US012166589B2

(12) United States Patent
Sun et al.

(10) Patent No.: US 12,166,589 B2
(45) Date of Patent: Dec. 10, 2024

(54) INAPPLICABLE TIMING VALUE FOR SIDELINK HYBRID AUTOMATIC REPEAT REQUEST FEEDBACK

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 636 days.

(21) Appl. No.: 17/445,255

(22) Filed: Aug. 17, 2021

(65) Prior Publication Data

US 2022/0103300 A1  Mar. 31, 2022

Related U.S. Application Data

(60) Provisional application No. 63/198,057, filed on Sep. 25, 2020.

(51) Int. Cl.
*H04L 1/18* (2023.01)
*H04L 1/1812* (2023.01)
(Continued)

(52) U.S. Cl.
CPC .......... *H04L 1/1812* (2013.01); *H04W 72/23* (2023.01)

(58) Field of Classification Search
CPC ... H04W 28/04; H04W 72/04; H04W 72/042; H04W 88/08; H04W 72/23; H04W 72/1289; H04L 5/0007; H04L 1/1812
(Continued)

(56) References Cited

U.S. PATENT DOCUMENTS 11,653,355 B2 * 5/2023 Ko .................. H04W 72/0453
  370/329
11,700,086 B2 * 7/2023 Park .................. H04L 1/1854
  370/329
(Continued)

FOREIGN PATENT DOCUMENTS

CN    110708146 A  *  1/2020  .............. H04L 1/18

OTHER PUBLICATIONS

3GPP TSG RAN WG1 Meeting #100bis-E, e-Meeting, Apr. 20-30, 2020, R1-2001993, Source: Intel Corporation, Title: Solutions to remaining opens of resource allocation mode-1 for NR V2X sidelink design, Agenda item: 7.2.4.2.1. (Year: 2020).*

(Continued)

*Primary Examiner* — Peter G Solinsky
*Assistant Examiner* — Sanjay K Dewan
(74) *Attorney, Agent, or Firm* — Harrity & Harrity, LLP

(57) ABSTRACT

Various aspects of the present disclosure generally relate to wireless communication. In some aspects, a user equipment (UE) may determine that a first timing value, received in first downlink control information (DCI) that schedules a first sidelink communication, for indicating a time duration between receiving the first DCI and transmitting first sidelink hybrid automatic repeat request (HARQ) feedback for the first sidelink communication is an inapplicable value. The UE may transmit the first sidelink HARQ feedback in a sidelink HARQ acknowledgment codebook based at least in part on receiving a second DCI that includes a second timing value that is a valid numerical value. Numerous other aspects are provided.

25 Claims, 17 Drawing Sheets

(51) Int. Cl.
*H04W 72/12* (2023.01)
*H04W 72/23* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2020/0106566 | A1* | 4/2020 | Yeo | H04W 28/04 |
| 2020/0314822 | A1* | 10/2020 | Lee | H04W 72/12 |
| 2021/0050953 | A1* | 2/2021 | Park | H04B 7/0456 |
| 2022/0322314 | A1* | 10/2022 | Rastegardoost | H04L 1/1854 |
| 2023/0023656 | A1* | 1/2023 | Rastegardoost | H04W 72/0446 |
| 2023/0084917 | A1* | 3/2023 | Li | H04W 72/25 |
| | | | | 370/329 |
| 2023/0094711 | A1* | 3/2023 | Wu | H04L 1/1887 |
| | | | | 370/329 |
| 2023/0104340 | A1* | 4/2023 | Park | H04W 52/0216 |
| | | | | 370/329 |
| 2023/0113672 | A1* | 4/2023 | Wu | H04L 1/1861 |
| | | | | 370/329 |
| 2023/0144804 | A1* | 5/2023 | Lee | H04W 56/006 |
| | | | | 370/329 |
| 2023/0146928 | A1* | 5/2023 | Hwang | H04W 52/367 |
| | | | | 370/329 |
| 2023/0209530 | A1* | 6/2023 | Rastegardoost | H04L 1/1854 |
| | | | | 370/329 |

OTHER PUBLICATIONS

3GPP TSG RAN WG1 #100bis, e-Meeting, Apr. 20-30, 2020, R1-2002205, Agenda item: 7.2.4.2.1, Source: CMCC, Title: Remaining issues on mode-1 resource allocation mechanism. (Year: 2020).*

CMCC: "Remaining Issues on Mode-1 Resource Allocation Mechanism", 3GPP Draft, 3GPP TSG RAN WG1 #100bis, R1-2002205, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 11, 2020 (Apr. 11, 2020), XP051875484, 5 Pages, Retrieved from the Internet: URL: https://ftp.3gpp.org/tsg_ran/WG1_RL1/TSGR1_100b_e/Docs/R1-2002205.zip. [Retrieved on Apr. 11, 2020], Sections 2-4.

Intel Corporation: "Solutions to Remaining Opens of Resource Allocation Mode-1 for NR V2X Sidelink Design", 3GPP Draft, 3GPP TSG RAN WG1 Meeting #100bis-E, R1-2001993, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 30, 2020, Apr. 11, 2020 (Apr. 11, 2020), XP051875367, 10 Pages, Retrieved from the Internet: URL: https://ftp.3gpp.org/tsg_ran/WG1_RL1/TSGR1_100b_e/Docs/R1-2001993.zip. [Retrieved on Apr. 11, 2020] section 2.3.

International Search Report and Written Opinion—PCT/US2021/071220—ISA/EPO—Nov. 10, 2021.

* cited by examiner

INAPPLICABLE TIMING VALUE FOR SIDELINK HYBRID AUTOMATIC REPEAT REQUEST FEEDBACK

CROSS-REFERENCE TO RELATED APPLICATION

This Patent Application claims priority to U.S. Provisional Patent Application No. 63/198,057, filed on Sep. 25, 2020, entitled "INAPPLICABLE TIMING VALUE FOR SIDELINK HYBRID AUTOMATIC REPEAT REQUEST FEEDBACK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for using an inapplicable timing value for sidelink hybrid automatic repeat request feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes determining that a first timing value, received in first downlink control information (DCI) that schedules a first sidelink communication, for indicating a time duration between receiving the first DCI and transmitting first sidelink hybrid automatic repeat request (HARQ) feedback for the first sidelink communication, is an inapplicable value, and transmitting the first sidelink HARQ feedback in a sidelink HARQ acknowledgment (ACK) codebook based at least in part on receiving a second DCI that includes a second timing value that is a valid numerical value.

In some aspects, a method of wireless communication performed by a UE includes receiving, in first DCI that schedules a first sidelink communication, a first timing value for indicating a time duration between receiving the first DCI and transmitting first sidelink HARQ feedback for the first sidelink communication, where the first timing value is an inapplicable value. The method includes transmitting the first sidelink HARQ feedback in a sidelink HARQ ACK codebook based at least in part on receiving a second DCI that includes a second timing value that is a valid numerical value.

In some aspects, a method of wireless communication performed by a base station includes transmitting first DCI, to a UE, that includes an inapplicable value as a first timing value for indicating a time duration between receiving the first DCI that schedules a first sidelink communication and transmitting first sidelink HARQ feedback for the first sidelink communication. The method includes transmitting second DCI, to the UE, that includes a valid numerical value as a second timing value and receiving the first sidelink HARQ feedback on a physical uplink control channel (PUCCH) after transmitting the second DCI.

In some aspects, a method of wireless communication performed by a UE includes receiving, in first DCI that schedules a sidelink communication, a first timing value for indicating a time duration between receiving the first DCI and transmitting sidelink HARQ feedback for the sidelink communication, where the first timing value is an inapplicable value. The method includes transmitting, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold.

In some aspects, a method of wireless communication performed by a UE includes determining that a first timing value, in first DCI that schedules a sidelink communication, for indicating a time duration between receiving the first DCI and transmitting sidelink HARQ feedback for the sidelink communication, is an inapplicable value, and transmitting, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold.

In some aspects, a method of wireless communication performed by a base station includes transmitting first DCI, to a UE, that includes an inapplicable value as a first timing value for indicating a time duration between receiving the first DCI that schedules a first sidelink communication and transmitting first sidelink HARQ feedback for the first sidelink communication. The method includes transmitting second DCI, to the UE, that includes a valid numerical value as a second timing value and receiving, after transmitting the second DCI, one or more of the sidelink HARQ feedback or HARQ feedback for a Uu interface based at least in part on a priority value of the sidelink HARQ feedback.

In some aspects, a UE for wireless communication includes a memory and one or more processors coupled to the memory, the one or more processors configured to determine that a first timing value, received in first DCI that schedules a first sidelink communication, for indicating a time duration between receiving the first DCI and transmitting first sidelink HARQ feedback for the first sidelink communication, is an inapplicable value, and transmit the first sidelink HARQ feedback in a sidelink HARQ ACK codebook based at least in part on receiving a second DCI that includes a second timing value that is a valid numerical value.

In some aspects, a UE for wireless communication includes a memory and one or more processors coupled to the memory, the one or more processors configured to receive, in first DCI that schedules a first sidelink communication, a first timing value for indicating a time duration between receiving the first DCI and transmitting first sidelink HARQ feedback for the first sidelink communication, where the first timing value is an inapplicable value. The one or more processors are configured to transmit the first sidelink HARQ feedback in a sidelink HARQ ACK codebook based at least in part on receiving a second DCI that includes a second timing value that is a valid numerical value.

In some aspects, a base station for wireless communication includes a memory and one or more processors coupled to the memory, the one or more processors configured to transmit first DCI, to a UE, that includes an inapplicable value as a first timing value for indicating a time duration between receiving the first DCI that schedules a first sidelink communication and transmitting first sidelink HARQ feedback for the first sidelink communication. The one or more processors are configured to transmit second DCI, to the UE, that includes a valid numerical value as a second timing value and receive the first sidelink HARQ feedback on a PUCCH after transmitting the second DCI.

In some aspects, a UE for wireless communication includes a memory and one or more processors coupled to the memory, the one or more processors configured to determine that a first timing value, in first DCI that schedules a sidelink communication, for indicating a time duration between receiving the first DCI and transmitting sidelink HARQ feedback for the sidelink communication, is an inapplicable value. The one or more processors are configured to transmit, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold.

In some aspects, a UE for wireless communication includes a memory and one or more processors coupled to the memory, the one or more processors configured to receive, in first DCI that schedules a sidelink communication, a first timing value for indicating a time duration between receiving the first DCI and transmitting sidelink HARQ feedback for the sidelink communication, where the first timing value is an inapplicable value. The one or more processors are configured to transmit, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold.

In some aspects, a base station for wireless communication includes a memory and one or more processors coupled to the memory, the one or more processors configured to transmit first DCI, to a UE, that includes an inapplicable value as a first timing value for indicating a time duration between receiving the first DCI that schedules a first sidelink communication and transmitting first sidelink HARQ feedback for the first sidelink communication. The one or more processors are configured to transmit second DCI, to the UE, that includes a valid numerical value as a second timing value and receive, after transmitting the second DCI, one or more of the sidelink HARQ feedback or HARQ feedback for a Uu interface based at least in part on a priority value of the sidelink HARQ feedback.

In some aspects, a non-transitory computer-readable medium storing a set of instructions for wireless communication includes one or more instructions that, when executed by one or more processors of a UE, cause the UE to determine that a first timing value, received in first DCI that schedules a first sidelink communication, for indicating a time duration between receiving the first DCI and transmitting first sidelink HARQ feedback for the first sidelink communication, is an inapplicable value, and transmit the first sidelink HARQ feedback in a sidelink HARQ ACK codebook based at least in part on receiving a second DCI that includes a second timing value that is a valid numerical value.

In some aspects, a non-transitory computer-readable medium storing a set of instructions for wireless communication includes one or more instructions that, when executed by one or more processors of a UE, cause the UE to receive, in first DCI that schedules a first sidelink communication, a first timing value for indicating a time duration between receiving the first DCI and transmitting first sidelink HARQ feedback for the first sidelink communication, where the first timing value is an inapplicable value. The set of instructions, when executed by one or more processors of the UE, cause the UE to transmit the first sidelink HARQ feedback in a sidelink HARQ ACK codebook based at least in part on receiving a second DCI that includes a second timing value that is a valid numerical value.

In some aspects, a non-transitory computer-readable medium storing a set of instructions for wireless communication includes one or more instructions that, when executed by one or more processors of a base station, cause the base station to transmit first DCI, to a UE, that includes an inapplicable value as a first timing value for indicating a time duration between receiving the first DCI that schedules a first sidelink communication and transmitting first sidelink HARQ feedback for the first sidelink communication, transmit second DCI, to the UE, that includes a valid numerical value as a second timing value, and receive the first sidelink HARQ feedback on a PUCCH after transmitting the second DCI.

In some aspects, a non-transitory computer-readable medium storing a set of instructions for wireless communication includes one or more instructions that, when executed by one or more processors of a UE, cause the UE to determine that a first timing value, in first DCI that schedules a sidelink communication, for indicating a time duration between receiving the first DCI and transmitting sidelink HARQ feedback for the sidelink communication, is an inapplicable value, and transmit, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold.

In some aspects, a non-transitory computer-readable medium storing a set of instructions for wireless communication includes one or more instructions that, when executed by one or more processors of a UE, cause the UE to receive, in first DCI that schedules a sidelink communication, a first timing value for indicating a time duration between receiving the first DCI and transmitting sidelink HARQ feedback for the sidelink communication, where the first timing value is an inapplicable value. The set of instructions, when executed by one or more processors of the one or more instructions that, when executed by one or more processors of an UE, cause the one or more instructions that, when executed by one or more processors of an UE to transmit, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold.

In some aspects, a non-transitory computer-readable medium storing a set of instructions for wireless communication includes one or more instructions that, when executed by one or more processors of a base station, cause the base station to transmit first DCI, to a UE, that includes an inapplicable value as a first timing value for indicating a time duration between receiving the first DCI that schedules a first sidelink communication and transmitting first sidelink HARQ feedback for the first sidelink communication; transmit second DCI, to the UE, that includes a valid numerical value as a second timing value; and receive, after transmitting the second DCI, one or more of the sidelink HARQ feedback or HARQ feedback for a Uu interface based at least in part on a priority value of the sidelink HARQ feedback.

In some aspects, an apparatus for wireless communication includes means for determining that a first timing value, received in first DCI that schedules a first sidelink communication, for indicating a time duration between receiving the first DCI and transmitting first sidelink HARQ feedback for the first sidelink communication, is an inapplicable value, and means for transmitting the first sidelink HARQ feedback in a sidelink HARQ ACK codebook based at least in part on receiving a second DCI that includes a second timing value that is a valid numerical value.

In some aspects, an apparatus for wireless communication includes means for receiving, in first DCI that schedules a first sidelink communication, a first timing value for indicating a time duration between receiving the first DCI and transmitting first sidelink HARQ feedback for the first sidelink communication, where the first timing value is an inapplicable value. The apparatus includes means for transmitting the first sidelink HARQ feedback in a sidelink HARQ ACK codebook based at least in part on receiving a second DCI that includes a second timing value that is a valid numerical value.

In some aspects, an apparatus for wireless communication includes means for transmitting first DCI, to a UE, that includes an inapplicable value as a first timing value for indicating a time duration between receiving the first DCI that schedules a first sidelink communication and transmitting first sidelink HARQ feedback for the first sidelink communication, means for transmitting second DCI, to the UE, that includes a valid numerical value as a second timing value, and means for receiving the first sidelink HARQ feedback on a PUCCH after transmitting the second DCI.

In some aspects, an apparatus for wireless communication includes means for determining that a first timing value, in first DCI that schedules a sidelink communication, for indicating a time duration between receiving the first DCI and transmitting sidelink HARQ feedback for the sidelink communication, is an inapplicable value, and means for transmitting, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold.

In some aspects, an apparatus for wireless communication includes means for receiving, in first DCI that schedules a sidelink communication, a first timing value for indicating a time duration between receiving the first DCI and transmitting sidelink HARQ feedback for the sidelink communication, where the first timing value is an inapplicable value. The apparatus includes means for transmitting, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold.

In some aspects, an apparatus for wireless communication includes means for transmitting first DCI, to a UE, that includes an inapplicable value as a first timing value for indicating a time duration between receiving the first DCI that schedules a first sidelink communication and transmitting first sidelink HARQ feedback for the first sidelink communication, means for transmitting second DCI, to the UE, that includes a valid numerical value as a second timing value, and means for receiving, after transmitting the second DCI, one or more of the sidelink HARQ feedback or HARQ feedback for a Uu interface based at least in part on a priority value of the sidelink HARQ feedback.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
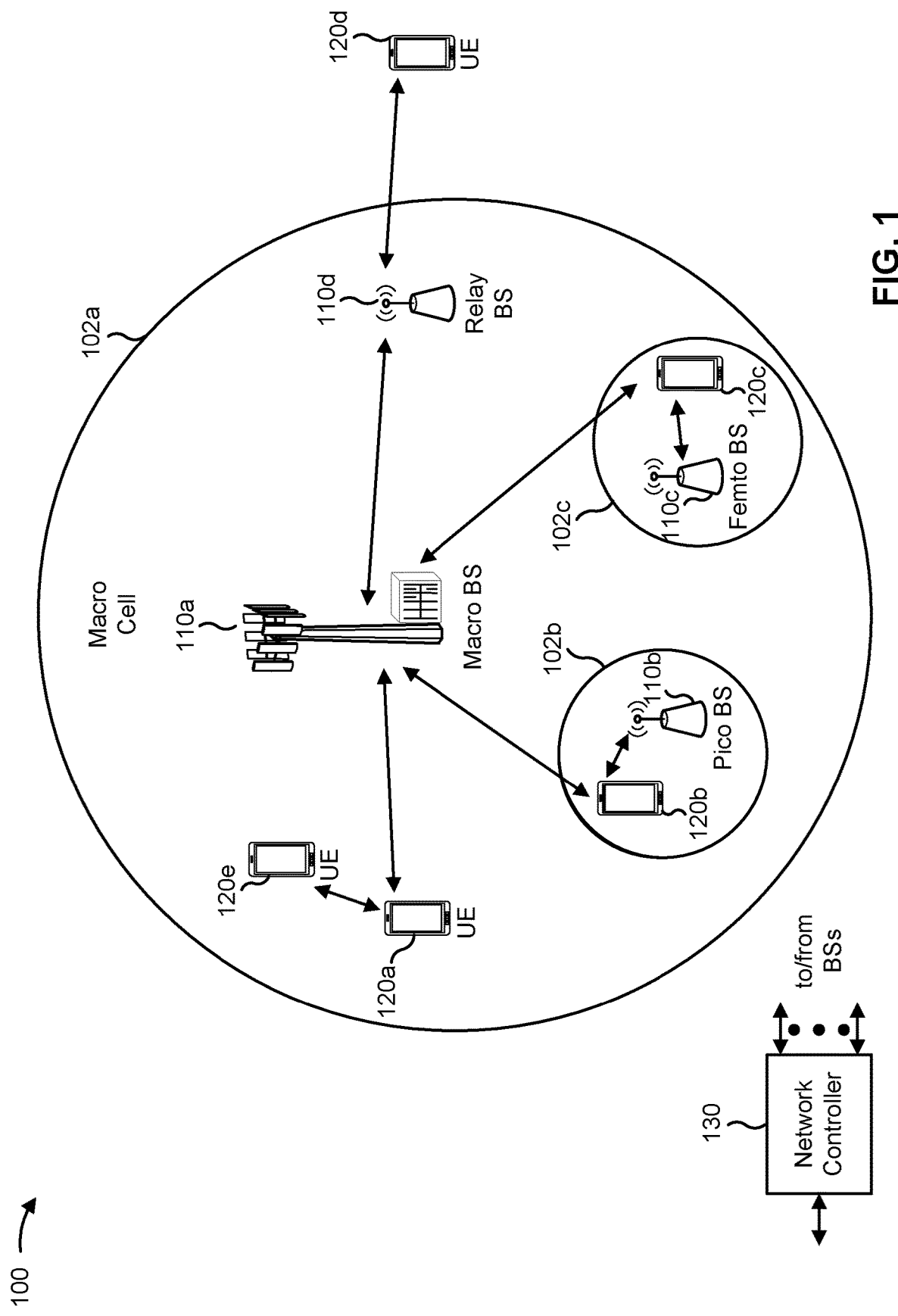
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, vehicle-to-pedestrian (V2P), or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
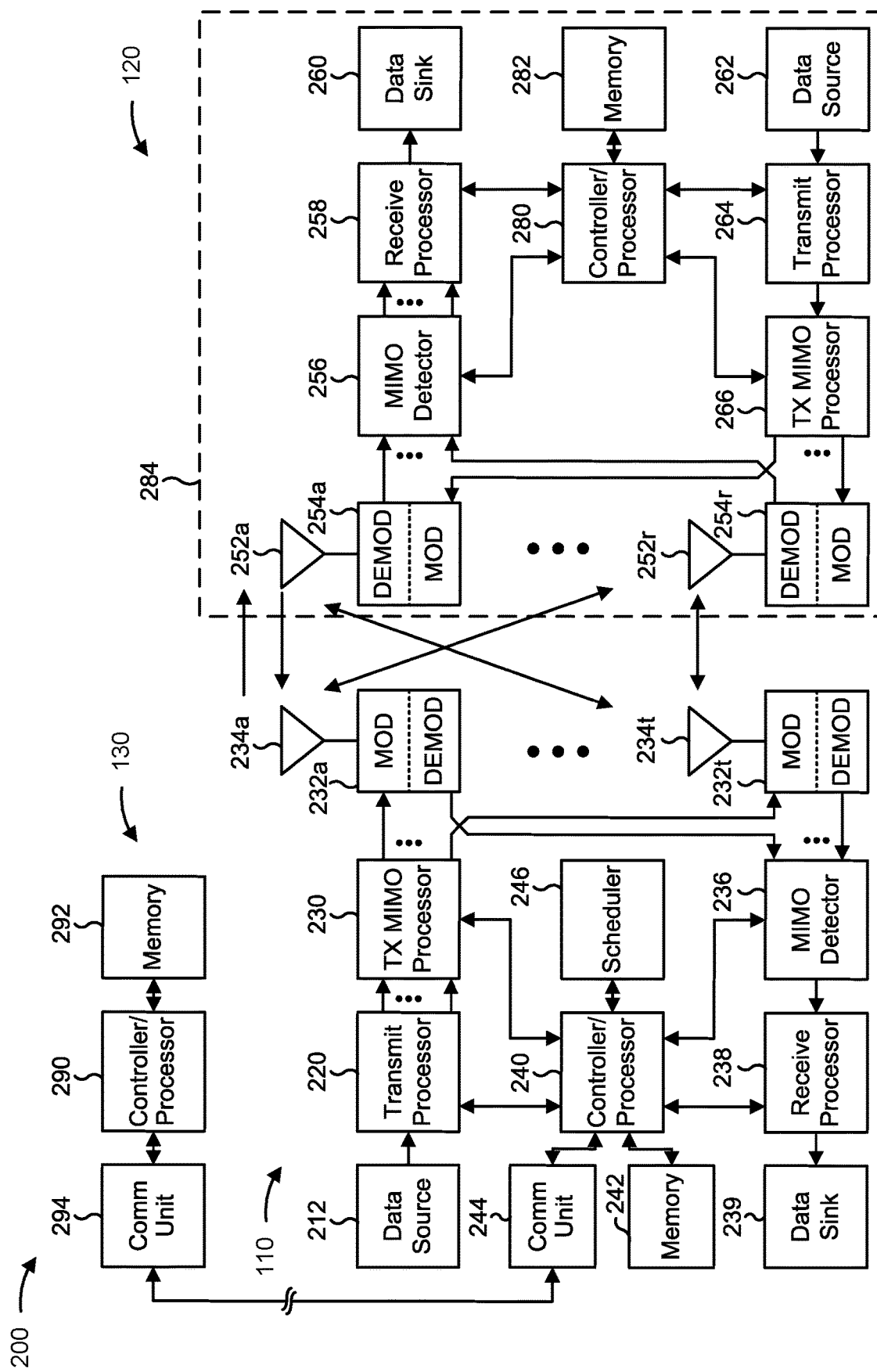
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-17).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-17).

Controller/processor 240 of base station 110, controller/processor 280 of UE 120, and/or any other component(s) of FIG. 2 may perform one or more techniques associated with using an inapplicable timing value for sidelink hybrid automatic repeat request (HARD) feedback, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 1000 of FIG. 10, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, UE 120 includes means for determining that a first timing value, received in first downlink control information (DCI) that schedules a first sidelink communication, for indicating a time duration between receiving the first DCI and transmitting first sidelink HARQ feedback for the first sidelink communication, is an inapplicable value, and/or means for transmitting the first sidelink HARQ feedback in a sidelink HARQ acknowledgment (ACK) codebook based at least in part on receiving a second DCI that includes a second timing value that is a valid numerical value. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, UE 120 includes means for buffering the first sidelink HARQ feedback after determining that the first timing value is an inapplicable value.

In some aspects, UE 120 includes means for incrementing a sidelink assignment indicator counter until a timing value with a valid numerical value is received.

In some aspects, base station 110 includes means for transmitting first DCI, to a UE, that includes an inapplicable value as a first timing value for indicating a time duration between receiving the first DCI that schedules a first sidelink communication and transmitting first sidelink HARQ feedback for the first sidelink communication; means for transmitting second DCI, to the UE, that includes a valid numerical value as a second timing value; and/or means for receiving the first sidelink HARQ feedback on a physical uplink control channel (PUCCH) after transmitting the second DCI. The means for base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, UE 120 includes means for determining that a first timing value, in first DCI that schedules a sidelink communication, for indicating a time duration between receiving the first DCI and transmitting sidelink HARQ feedback for the sidelink communication, is an inapplicable value, and/or means for transmitting, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, UE 120 includes means for discarding the sidelink HARQ feedback.

In some aspects, UE 120 includes means for buffering the sidelink HARQ feedback, and/or means for transmitting the buffered sidelink HARQ feedback multiplexed with other HARQ feedback after receiving a third DCI with a third timing value having a valid numerical value.

In some aspects, base station 110 includes means for transmitting first DCI, to a UE, that includes an inapplicable value as a first timing value for indicating a time duration between receiving the first DCI that schedules a first sidelink communication and transmitting first sidelink HARQ feedback for the first sidelink communication; means for transmitting second DCI, to the UE, that includes a valid numerical value as a second timing value, and/or means for receiving, after transmitting the second DCI, one or more of the sidelink HARQ feedback or HARQ feedback for a Uu interface based at least in part on a priority value of the sidelink HARQ feedback. The means for base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, base station 110 includes means for transmitting a first threshold and a second threshold for comparing a sidelink HARQ feedback priority.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A base station (e.g., gNB) may transmit a downlink communication on a Uu interface to a UE. The UE may report HARQ feedback (e.g., acknowledgement or negative acknowledgement (ACK/NACK) information) indicating whether the communication was successful or unsuccessful. The base station may transmit DCI to the UE that includes a timing value K1, which specifies a time duration between when the DCI is received by the UE and when the UE is to transmit the HARQ feedback.

In some aspects, the base station may include an inapplicable timing value for K1, such as a non-numerical value for K1 (NNK1), or otherwise invalid value, in the DCI. A non-numerical timing value may be a value that is not a valid numerical value and thus not applicable for use as a timing value for K1 (e.g., inapplicable value for parameter dl-DataToUL-ACK). The base station may indicate, for example, NNK1 as the timing value when the base station does not have sufficient data to determine a time to schedule the UE to report HARQ feedback for a downlink communication on a granted resource of a physical downlink shared channel (PDSCH). For example, in an NR unlicensed frequency band (NR-U), the base station may schedule the downlink communication on the PDSCH near an end of a channel occupancy time (COT) such that the HARQ feedback cannot be reported in the same COT. Instead of scheduling a K1 value outside of the COT and risking the UE failing to transmit a communication, the base station may indicate NNK1 for the PDSCH, and in the next COT, the base station may schedule another communication on the PDSCH with a valid numerical K1 value. The UE may multiplex the HARQ feedback corresponding to the NNK1 in a same reporting opportunity as for the communication associated with the valid K1 value. In some aspects, the base station may transmit an empty downlink grant (without an associated resource for a communication on the PDSCH) with a valid K1 value, and the UE may report the HARQ feedback corresponding to the NNK1 in the next reporting opportunity.

Figure 3:
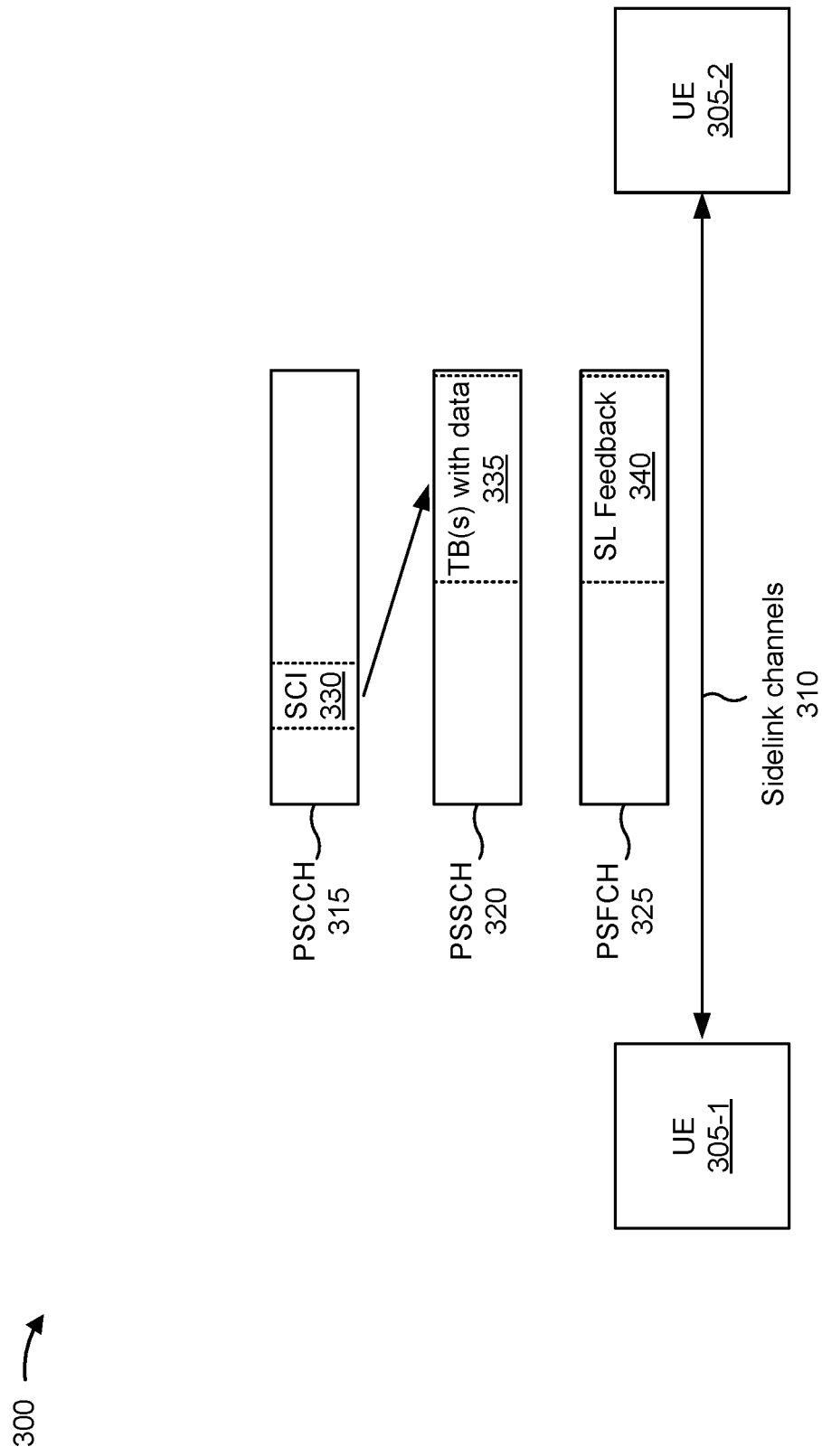
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a PUCCH used for cellular communications with a base station 110 via an access link or an access channel. The PSSCH 320 may be used to communicate data, similar to a PDSCH and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as HARQ feedback (e.g., ACK/NACK), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode, known as sidelink mode 2, where resource selection and/or scheduling is performed by the UE 305 (e.g., rather than a base station 110 in sidelink mode 1). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode (sidelink mode 2) where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
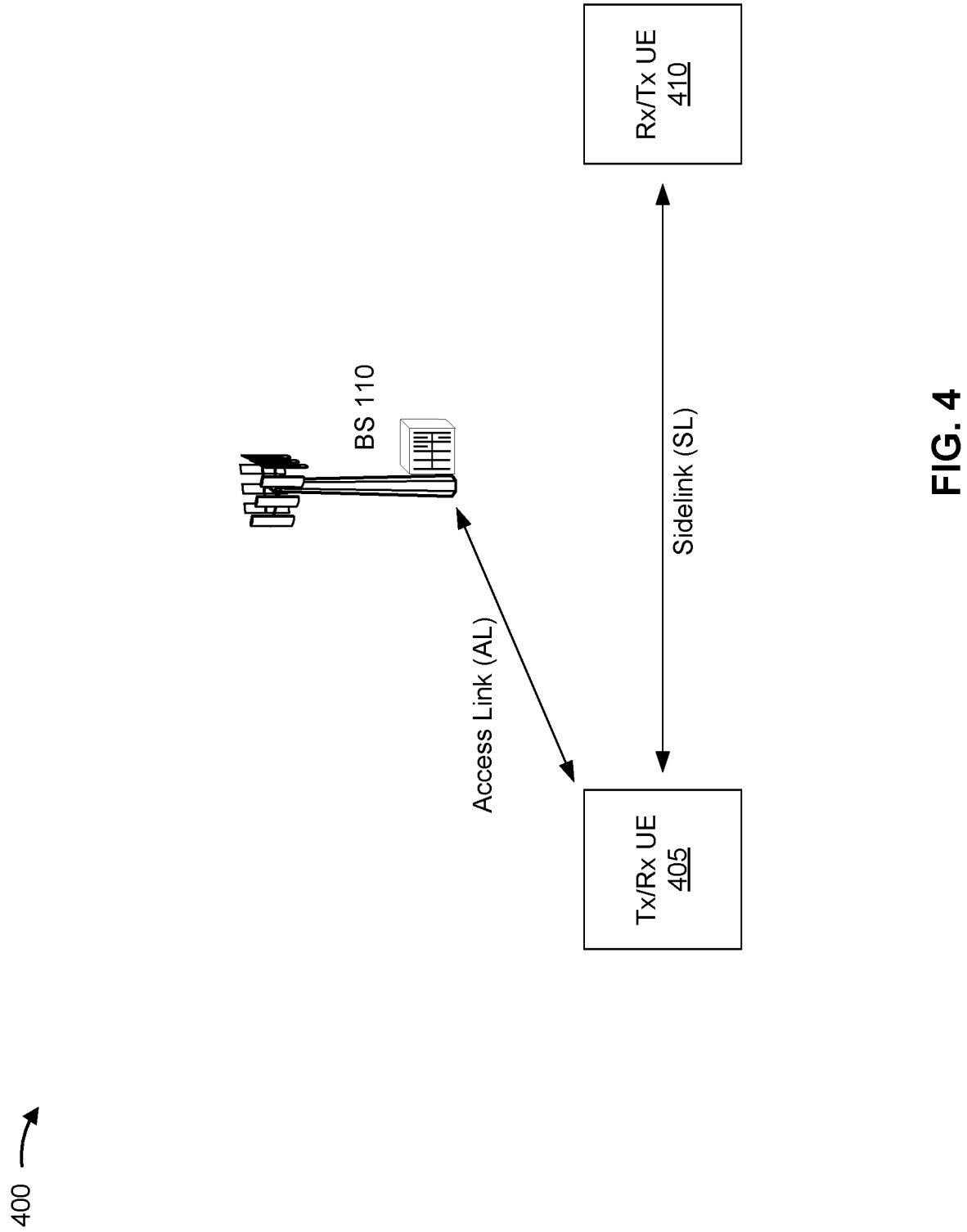
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, such as sidelink mode 1, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 405 and 410 (e.g., via a PC5 interface) may be referred to as a sidelink, and a direct link between a base station 110 and a UE 405 (e.g., via a Uu interface) may be referred to as an access link. Sidelink communications may be transmitted via the sidelink, and access link communications may be transmitted via the access link. An access link communication may be either a downlink communication (from base station 110 to UE 405) or an uplink communication (from UE 405 to base station 110). UE 405 may use a type 3 codebook, triggered by a bit added in DCI 1_1, to report an ACK or NACK for all configured HARQ processes for the Uu interface. A type 3 codebook may be used to map data to antennas and/or a physical channel to provide more accurate feedback than type I or type II codebooks. UE 405 may also report a new data indicator for each HARQ process with the ACK or NACK.

UE 410 may send sidelink HARQ feedback (ACK or NACK) for a sidelink communication to UE 405, and UE 405 may report the sidelink HARQ feedback to base station 110. The sidelink HARQ feedback may be multiplexed into a codebook that is reported on PUCCH or PUSCH. However, if there is a collision between sidelink HARQ feedback, an uplink communication (e.g., on a Uu interface), and/or HARQ feedback for the uplink communication, there is a mechanism to drop the sidelink HARQ feedback, the uplink communication, and/or the HARQ feedback for the Uu interface. The mechanism dropping a communication or HARQ feedback may involve prioritizing the sidelink HARQ feedback, the uplink communication, and/or the HARQ feedback for the uplink communication. A priority value of 0 indicates a highest priority, and 1 indicates a next highest priority. If an uplink communication with a priority value of 1 is to be transmitted, such as for ultra-reliable low-latency communication (URLLC), UE 405 may transmit the sidelink HARQ feedback if a priority value of the sidelink HARQ feedback is lower (higher priority) than a certain threshold for URLLC (e.g., sl-PriorityThresholdU-LURLLC). Otherwise, UE 405 may transmit the uplink communication and drop the sidelink HARQ feedback. A priority value of 1 for an uplink communication is a higher priority than a priority value of 2 for the sidelink HARQ feedback. UE 405 may determine to transmit an uplink communication with a priority value of 0 for enhanced mobile broadband (eMBB). If the sidelink HARQ feedback has a lower priority value than a sidelink priority threshold (e.g., sl-Priority Threshold), UE 405 may transmit the sidelink HARQ feedback. Otherwise, UE 405 may transmit an uplink communication with a priority value of 0. In sum, base station 110 may use a radio resource control (RRC) configuration to prioritize between an uplink transmission/HARQ feedback (URLLC or eMBB) on the PUCCH/PUSCH and sidelink HARQ feedback on the PUCCH.

In sidelink mode 1, base station 110 may specify resources, via DCI on the access link, for UE 405 to use for transmitting a sidelink communication to UE 410 on the sidelink. The DCI may include a resource indicator, and the sidelink HARQ feedback that is reported by UE 405 may depend on a PSFCH resource specified by base station 110. The DCI may also schedule the sidelink communication and indicate a HARQ feedback timing value for a time duration between receiving DCI and transmitting HARQ feedback. If base station 110 configures a type 1 sidelink configured grant (CG), an RRC parameter may include a parameter (e.g., sl-ACKtoUL-ACK) to indicate a timing for the sidelink HARQ feedback. If base station 110 configures a type 2 sidelink CG, activation DCI 3_0 may provide the timing for the sidelink HARQ feedback.

While the base station may indicate a timing value K1 in DCI for reporting sidelink HARQ feedback, the base station may not be able to provide a numerical value for K1. This may be to prevent a scheduling collision or to avoid another scheduling difficulty. However, without any timing indication for sidelink HARQ feedback, the sidelink HARQ feedback will not be transmitted. If the sidelink HARQ feedback is never transmitted, base station 110 may not receive the sidelink HARQ feedback to determine whether sidelink communications (in sidelink mode 1) transmitted by UE 405 to UE 410 are failing, and communications may degrade. As a result, UE 405 may waste power, processing resources, and signaling resources on transmitting sidelink resources that are failing.

As indicated above, FIG. 4 is provided as an example. Other examples may differ from what is described with respect to FIG. 4.

Figure 5:
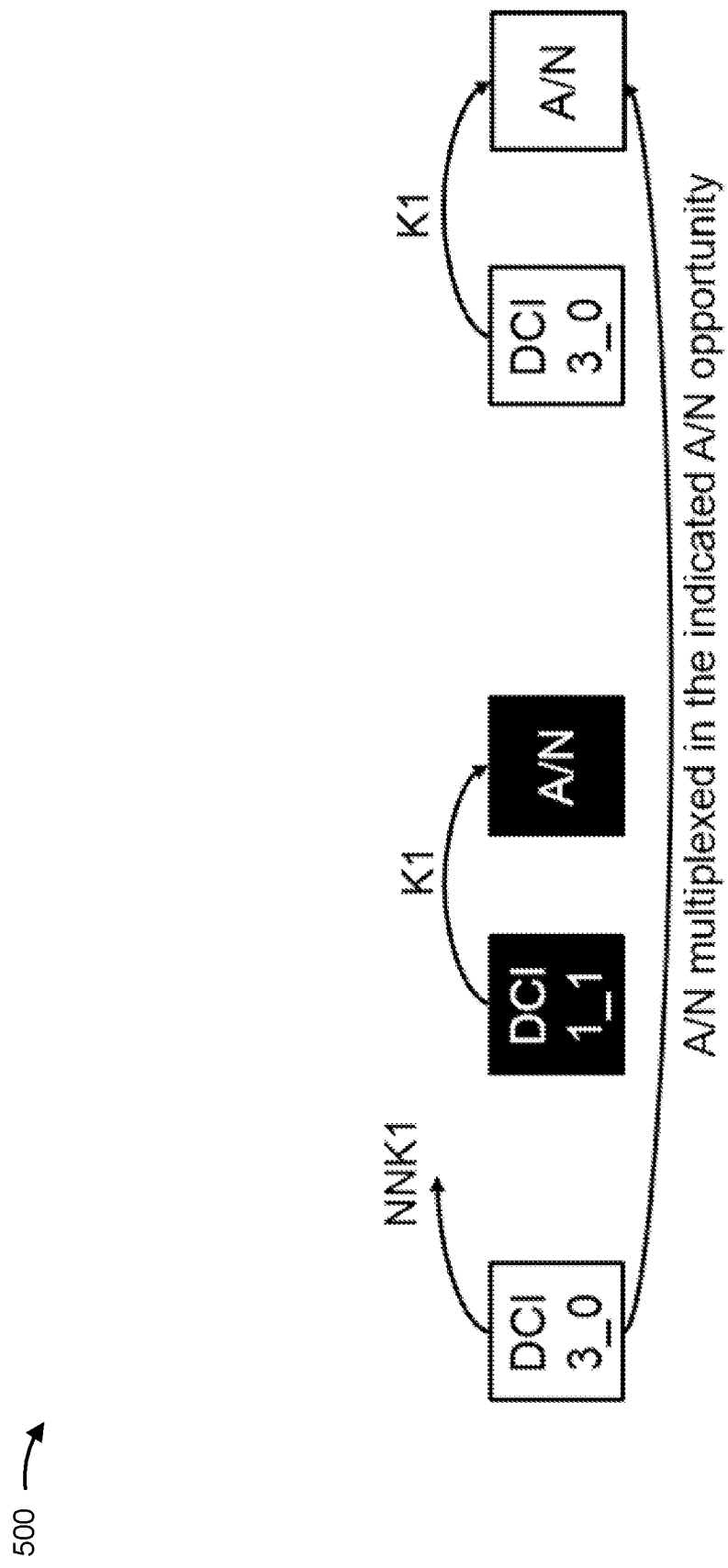
FIG. 5 is a diagram illustrating an example of using an inapplicable timing value for sidelink hybrid automatic repeat request (HARQ) feedback, in accordance with the present disclosure.

FIG. 5 is a diagram illustrating an example 500 of using an inapplicable timing value for sidelink HARQ feedback, in accordance with the present disclosure.

According to various aspects described herein, a UE may receive an inapplicable timing value for K1, such as a non-numerical timing value for K1 (NNK1), to be used for sidelink HARQ feedback for a sidelink communication. For example, a base station may indicate NNK1 in DCI 3_0 as a timing value for reporting sidelink HARQ feedback. The UE may buffer the sidelink HARQ feedback and any other sidelink HARQ feedback. The UE may later receive a DCI 3_0 with a valid timing value (e.g., numerical value such as an amount of time or a quantity of symbols) for reporting new sidelink HARQ feedback, and multiplex the buffered sidelink HARQ feedback with the new sidelink HARQ feedback in a HARQ ACK codebook. The UE may transmit the HARQ ACK codebook so that the base station may reschedule sidelink communications or make other scheduling adjustments based at least in part on the buffered sidelink HARQ feedback. As a result, the UE conserves power, processing resources, and signaling resources that would otherwise be wasted by transmitting sidelink communications that are failing.

Example 500 helps to illustrate these aspects. Example 500 shows a first DCI 3_0, for a first communication, with a timing value that is non-numerical (NNK1) for reporting sidelink HARQ feedback. A DCI 1_1 is then received. While the DCI 1_1 schedules HARQ feedback (e.g., ACK/NACK, shown as "A/N" in FIG. 5) for another communication, the DCI 1_1 does not present an opportunity for reporting the sidelink HARQ feedback associated with the first DCI 3_0. However, a second DCI 3_0 is received, and this time with a valid numerical timing value K1. A valid numerical value may also include a valid value that is not explicitly numerical but is representative of a numerical value. The feedback for the sidelink HARQ feedback for the first DCI 3_0 is concatenated or multiplexed with sidelink HARQ feedback for the second DCI 3_0 in a sidelink HARQ ACK codebook. The UE transmits the sidelink HARQ ACK codebook to the base station.

As indicated above, FIG. 5 is provided as an example. Other examples may differ from what is described with regard to FIG. 5.

Figure 6:
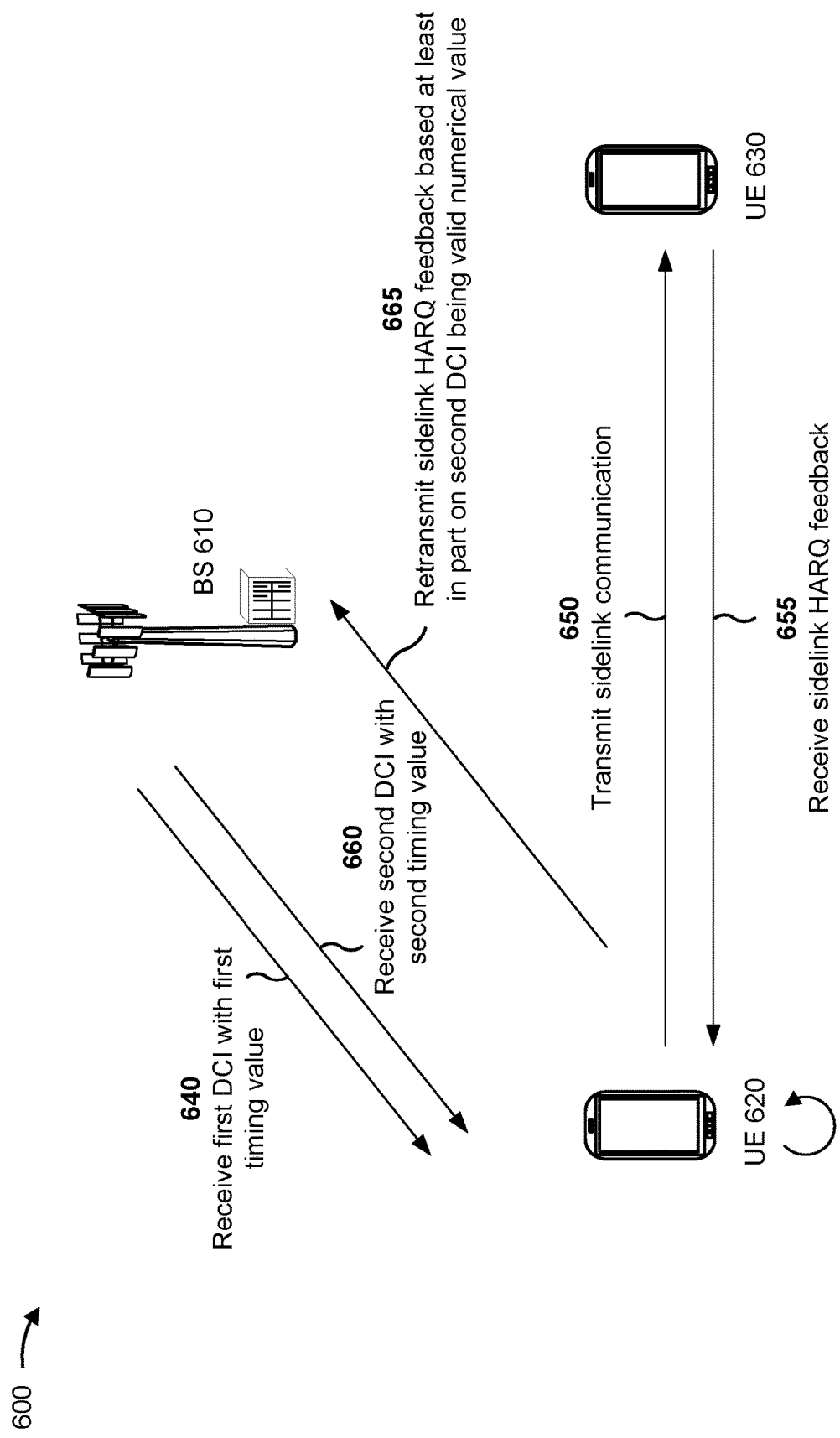
FIG. 6 is a diagram illustrating an example of using an inapplicable timing value for sidelink HARQ feedback, in accordance with the present disclosure.

FIG. 6 is a diagram illustrating an example 600 of using an inapplicable timing value for sidelink HARQ feedback, in accordance with the present disclosure. As shown in FIG. 6, example 600 includes communications between BS 610 (e.g., a BS 110 depicted in FIGS. 1 and 2) and a UE 620 (e.g., a UE 120 depicted in FIGS. 1 and 2). In some aspects, BS 610 and UE 620 may be included in a wireless network, such as wireless network 100. BS 610 and UE 620 may communicate on a wireless access link, which may include an uplink and a downlink on a Uu interface. FIG. 6 also shows that UE 620 may communicate on a sidelink with UE 630 in sidelink mode 1, where BS 610 specifies a sidelink channel resource for transmitting a sidelink communication.

As shown by reference number 640, UE 620 receives first DCI (e.g., DCI 3_0) with a first timing value. As shown by reference number 645, UE 620 determines that the first timing value is an inapplicable value. The first DCI schedules a downlink communication, which UE 620 transmits, as shown by reference number 650. UE 630 may determine whether the sidelink communication is successful. If so, UE 630 may transmit a HARQ ACK as sidelink HARQ feedback to UE 620. Otherwise, UE 630 may transmit a HARQ NACK as the sidelink HARQ feedback to UE 620. The ACK or NACK may be multiplexed into a sidelink HARQ codebook. As shown by reference number 655, UE 620 may receive the sidelink HARQ feedback. However, because the first DCI included an inapplicable timing value, UE 620 may buffer the sidelink HARQ feedback. In some aspects, UE 620 may increment or keep accumulating a sidelink assignment indicator (SAI) counter until a timing value with a valid numerical value is received.

As shown by reference number 660, UE 620 may receive second DCI (e.g., DCI 3_0) that includes a second timing value that is a valid numerical value. As shown by reference number 665, UE 620 may transmit the buffered sidelink HARQ feedback to BS 610 based at least in part on determining that the second timing value is a valid numerical value. By using a combination of an inapplicable timing value and a later valid numerical timing value, a UE may hold and report sidelink HARQ feedback that would otherwise be lost.

UE 620 may transmit the sidelink HARQ feedback as a HARQ ACK codebook, which may be a Type 3 codebook. In some aspects, UE 620 may multiplex the buffered sidelink HARQ feedback in the HARQ ACK codebook with other sidelink HARQ feedback. The sidelink HARQ feedback may be multiplexed with or may be separate from HARQ feedback for a Uu interface.

In some aspects, the second DCI may not include a valid sidelink resource grant such that the second DCI is used primarily for indicating a valid numerical timing value for reporting sidelink HARQ feedback. The second DCI may use a special combination of a frequency domain resource assignment (FDRA) field in the DCI (e.g., field is all 1's).

As indicated above, FIG. 6 is provided as an example. Other examples may differ from what is described with regard to FIG. 6.

Figure 7:
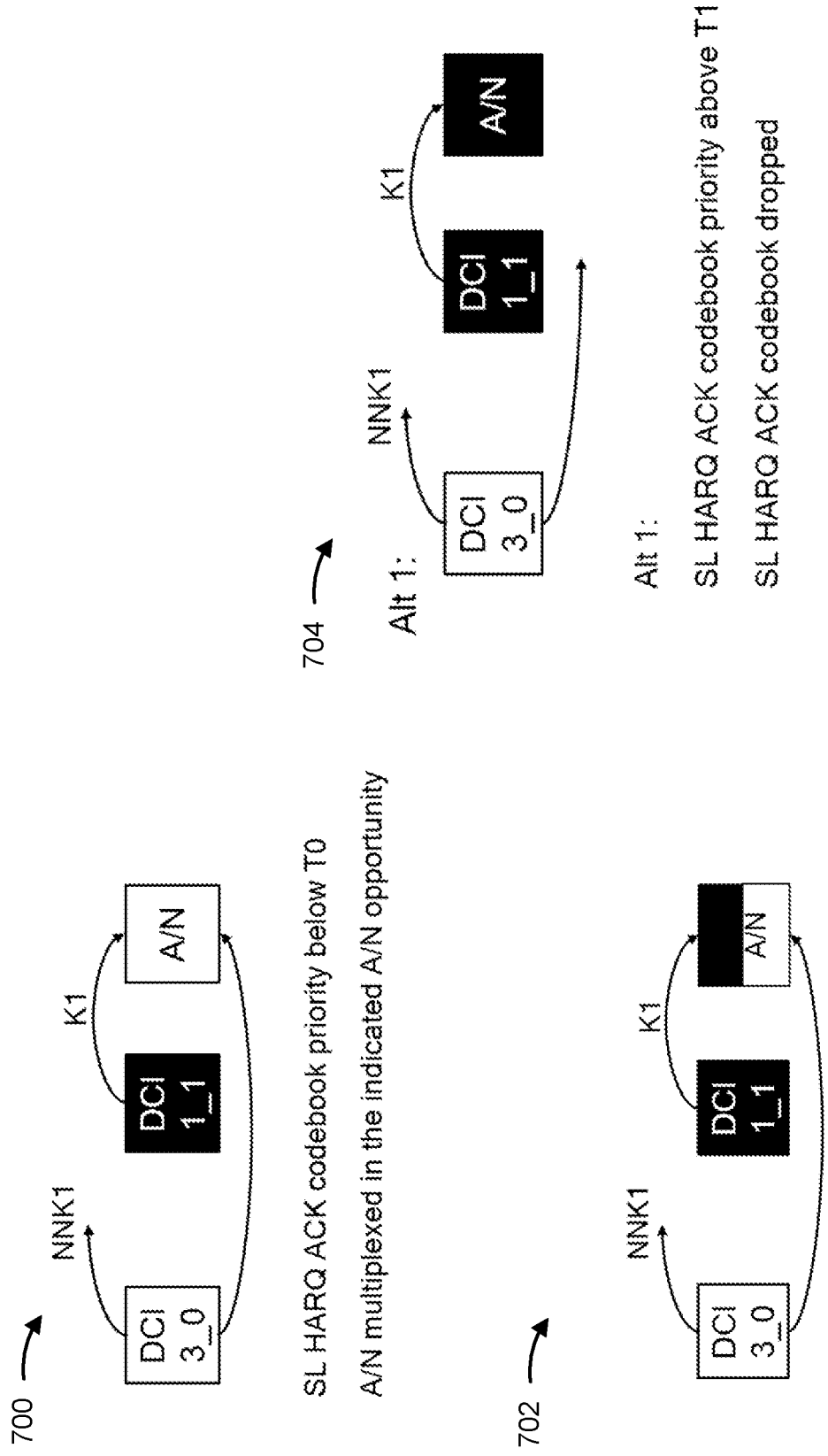
FIG. 7 is a diagram illustrating examples of using a priority value for sidelink HARQ feedback, in accordance with the present disclosure.

FIG. 7 is a diagram illustrating examples 700, 704, and 704 of using a priority value for sidelink HARQ feedback, in accordance with the present disclosure.

As described in connection with FIG. 4, a UE may compare priority values to drop sidelink HARQ feedback, an uplink communication, and/or HARQ feedback for a Uu interface. In some aspects, a UE may transmit or drop sidelink HARQ feedback based at least in part on a result of comparing a priority value of the sidelink HARQ feedback to a first threshold and a second threshold, which a base station may configure by RRC signaling. In this way, the UE may separately control transmission priorities, including for eMBB (priority 0) and for lower priority URLLC (priority 1). As noted above, a priority value of 0 is higher in priority than a priority value of 1.

Example 700 shows that, if a priority value of the sidelink HARQ feedback does not satisfy the first (lower) threshold (T0) (and thus does not satisfy the second (higher) threshold (T1)) (i.e., the priority value is lower than T0), the UE may transmit the sidelink HARQ feedback in a resource scheduled by DCI. The UE may multiplex the sidelink HARQ feedback into a HARQ ACK codebook.

Example 702 shows that, if a priority value of the sidelink HARQ feedback satisfies T0 but not T1 (i.e., is between T0 and T1), the UE may multiplex the sidelink HARQ feedback with HARQ feedback for a Uu interface into the HARQ ACK codebook.

Example 704 shows that, if a priority value of the sidelink HARQ feedback satisfies both T0 and T1 (i.e., is higher than T1), the UE may drop the sidelink HARQ feedback. The UE may instead transmit HARQ feedback for the Uu interface in the HARQ ACK codebook. In example 704, the UE may discard, rather than report, the dropped sidelink HARQ feedback in association with later DCI that includes a valid numerical timing value.

As indicated above, FIG. 7 provides examples. Other examples may differ from what is described with regard to FIG. 7.

Figure 8:
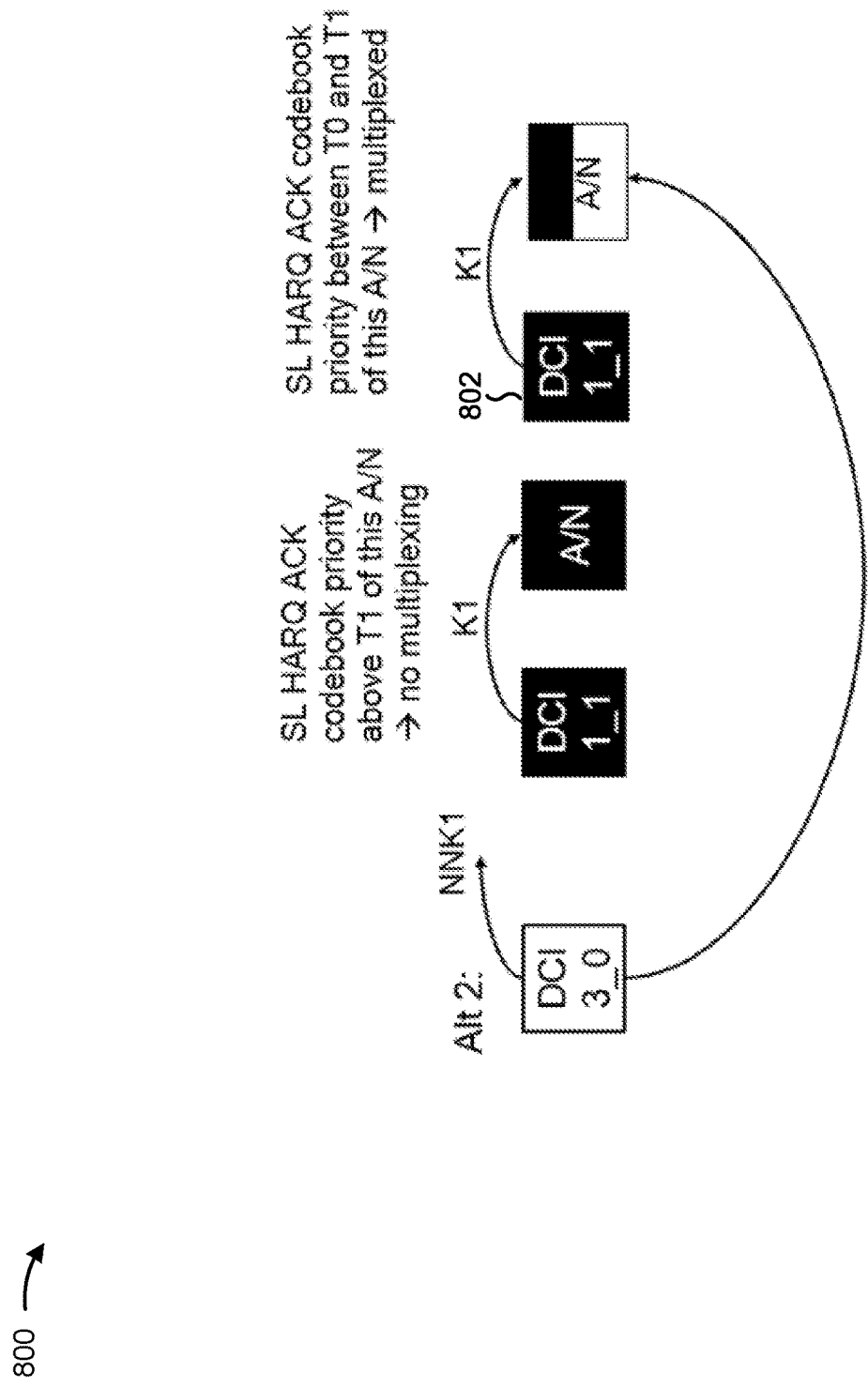
FIG. 8 is a diagram illustrating an example of using a priority value for sidelink HARQ feedback, in accordance with the present disclosure.

FIG. 8 is a diagram illustrating an example 800 of using a priority value for sidelink HARQ feedback, in accordance with the present disclosure.

While example 704 in FIG. 7 shows that a UE may discard sidelink HARQ feedback that is dropped due to a priority value being higher than a second threshold (T1), example 800 in FIG. 8 shows that, alternatively, the UE may buffer the dropped sidelink HARQ feedback for later transmission. If the UE receives third DCI 802 with a valid numerical timing value, the UE may transmit the buffered sidelink HARQ feedback in a resource associated with the third DCI 802. The UE may multiplex the buffered sidelink HARQ feedback with sidelink HARQ feedback of the third DCI and/or with HARQ feedback for a Uu interface, as combined HARQ ACK codebooks.

As indicated above, FIG. 8 is provided as an example 800. Other examples may differ from what is described with regard to FIG. 8.

Figure 9:
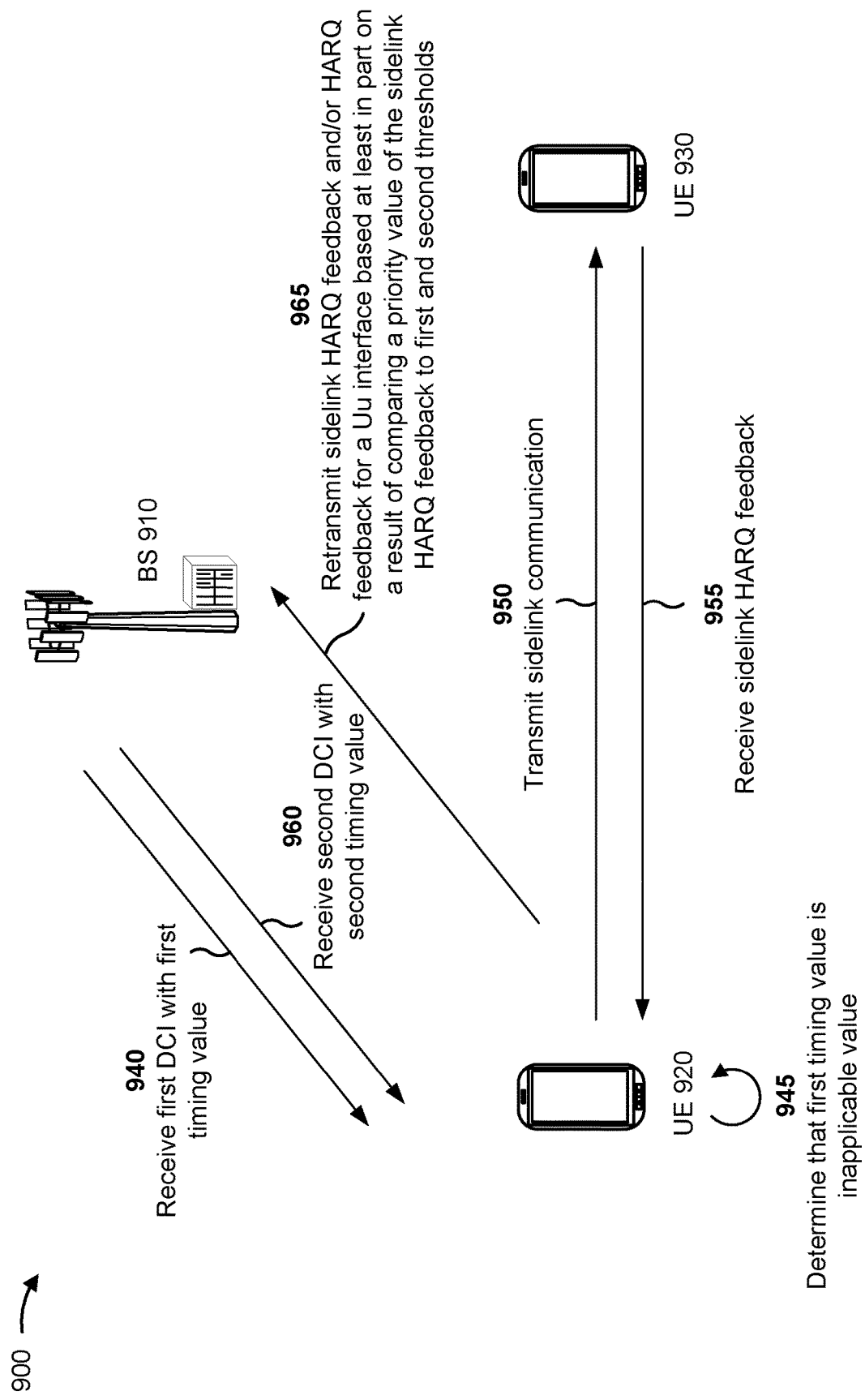
FIG. 9 is a diagram illustrating an example of using an inapplicable timing value for sidelink HARQ feedback, in accordance with the present disclosure.

FIG. 9 is a diagram illustrating an example 900 of using an inapplicable timing value for sidelink HARQ feedback, in accordance with the present disclosure. As shown in FIG. 9, example 900 includes communications between BS 910 (e.g., a BS 110 depicted in FIGS. 1 and 2) and a UE 920 (e.g., a UE 120 depicted in FIGS. 1 and 2). In some aspects, BS 910 and UE 920 may be included in a wireless network, such as wireless network 100. BS 910 and UE 920 may communicate on a wireless access link, which may include an uplink and a downlink on a Uu interface. FIG. 9 also shows that UE 920 may communicate on a sidelink with UE 930 in sidelink mode 1, where BS 910 specifies a sidelink channel resource for transmitting a sidelink communication.

As shown by reference number 940, UE 920 receives first DCI (e.g., DCI 3_0) with a first timing value. As shown by reference number 945, UE 920 determines that the first timing value is an inapplicable value (e.g., NNK1). The first DCI schedules a downlink communication, which UE 920 transmits, as shown by reference number 950. UE 930 may determine whether the sidelink communication is successful. If so, UE 930 may transmit a HARQ ACK as sidelink HARQ feedback to UE 920. Otherwise, UE 930 may transmit a HARQ NACK as the sidelink HARQ feedback to UE 920. The ACK or NACK may be multiplexed into a sidelink HARQ codebook. As shown by reference number 955, UE 920 may receive the sidelink HARQ feedback. However, because the first DCI included an inapplicable timing value, UE 920 may not transmit the sidelink HARQ feedback.

As shown by reference number 960, UE 920 may receive second DCI (e.g., DCI 3_0) that includes a second timing value that is a valid numerical value. UE 920 may transmit the buffered sidelink HARQ feedback to BS 910 based at least in part on determining that the second timing value is a valid numerical value and based at least in part on a priority value of the sidelink HARQ feedback. The priority value may be used to better control what HARQ feedback is transmitted back to BS 910.

As shown by reference number 965, UE 920 may transmit the sidelink HARQ feedback and/or HARQ feedback for the Uu interface based at least in part on a result of comparing the priority value of the sidelink HARQ feedback to a first threshold and to a second threshold. UE 920 may perform operations as described in connection with FIGS. 7-8 for determining what is to be transmitted in a HARQ ACK codebook to BS 910.

As indicated above, FIG. 9 is provided as an example. Other examples may differ from what is described with regard to FIG. 9.

Figure 10:
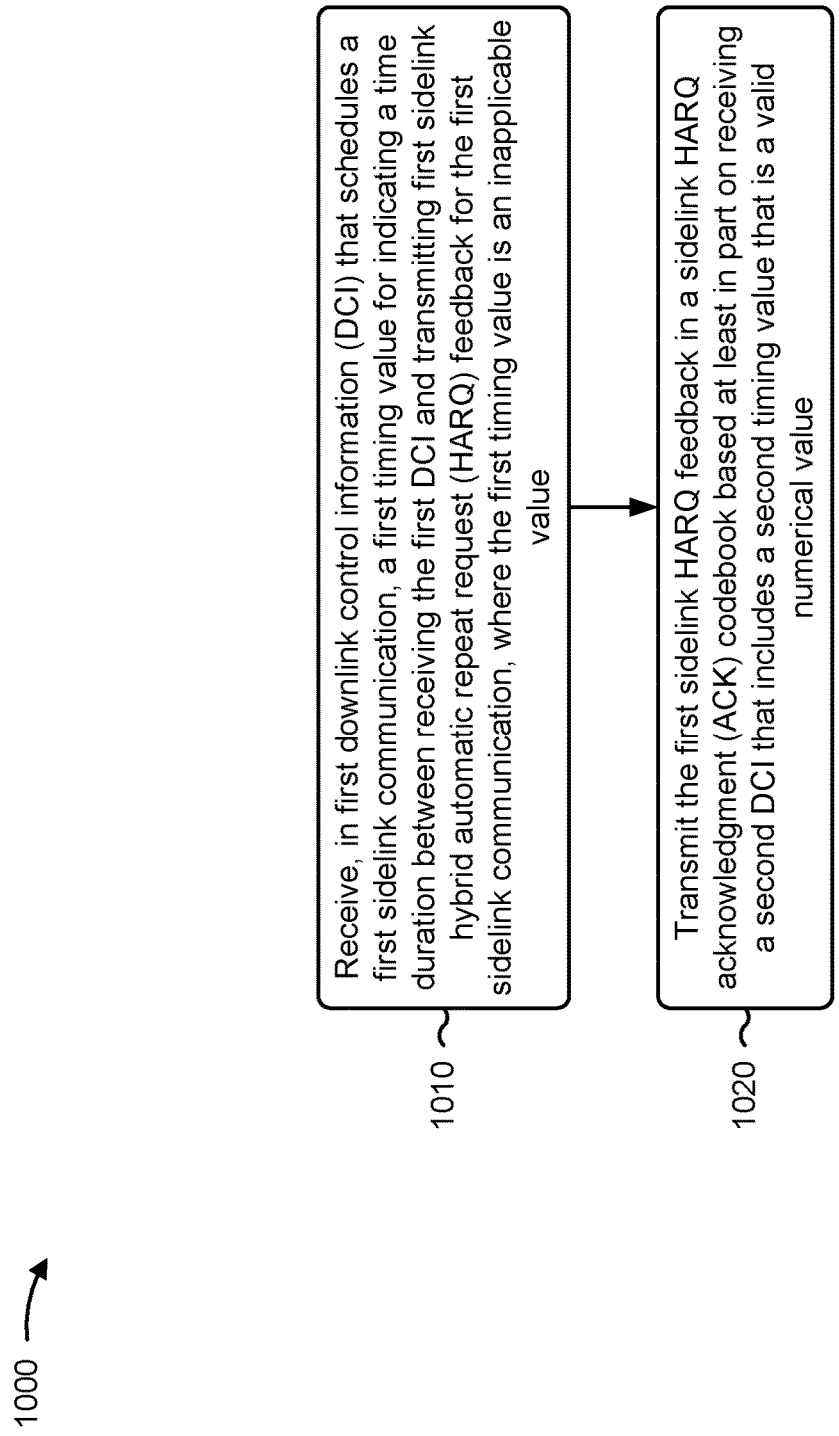
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120 depicted in FIGS. 1-2, UE 305-1 depicted in FIG. 3, UE 405 depicted in FIG. 4, UE 620 depicted in FIG. 6, UE 920 depicted in FIG. 9) performs operations associated with non-numerical timing value for sidelink HARQ feedback.

As shown in FIG. 10, in some aspects, process 1000 may include receiving, in first DCI that schedules a first sidelink communication, a first timing value for indicating a time duration between receiving the first DCI and transmitting first sidelink HARQ feedback for the first sidelink communication, where the first timing value is an inapplicable value (block 1010). For example, the UE (e.g., using reception component 1402 depicted in FIG. 14) may receive, in first DCI that schedules a first sidelink communication, a first timing value for indicating a time duration between receiving the first DCI and transmitting first sidelink HARQ feedback for the first sidelink communication, where the first timing value is an inapplicable value, as described above.

In some aspects, process 1000 may include determining that a first timing value, received in first DCI that schedules a first sidelink communication, for indicating a time duration between receiving the first DCI and transmitting first sidelink HARQ feedback for the first sidelink communication, is an inapplicable value. For example, the UE (e.g., using determination component 1408 depicted in FIG. 14) may determine that a first timing value, received in first DCI that schedules a first sidelink communication, for indicating a time duration between receiving the first DCI and transmitting first sidelink HARQ feedback for the first sidelink communication, is an inapplicable value, as described above.

As further shown in FIG. 10, in some aspects, process 1000 may include transmitting the first sidelink HARQ feedback in a sidelink HARQ ACK codebook based at least in part on receiving a second DCI that includes a second timing value that is a valid numerical value (block 1020). For example, the UE (e.g., using transmission component 1404 depicted in FIG. 14) may transmit the first sidelink HARQ feedback in a sidelink HARQ ACK codebook based at least in part on receiving a second DCI that includes a second timing value that is a valid numerical value, as described above.

Process 1000 may include additional aspects, such as any single aspect or any combination of aspects described below and/or in connection with one or more other processes described elsewhere herein.

In a first aspect, the first DCI and the second DCI are in DCI format 3_0.

In a second aspect, alone or in combination with the first aspect, the second DCI schedules a second sidelink communication, and process 1000 further includes multiplexing the first sidelink HARQ feedback with second sidelink HARQ feedback for the second sidelink communication into the sidelink HARQ ACK codebook.

In a third aspect, alone or in combination with one or more of the first and second aspects, process 1000 includes buffering the first sidelink HARQ feedback after determining that the first timing value is an inapplicable value.

In a fourth aspect, alone or in combination with one or more of the first through third aspects, the second DCI does not schedule sidelink resources for a second sidelink communication, and the second DCI includes an FDRA field in DCI format 3_0 that is set to invalid.

In a fifth aspect, alone or in combination with one or more of the first through fourth aspects, process 1000 includes incrementing an SAI counter until a timing value with a valid numerical value is received.

In a sixth aspect, alone or in combination with one or more of the first through fifth aspects, the first sidelink HARQ feedback is not multiplexed with HARQ feedback for a Uu interface in the sidelink HARQ ACK codebook.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
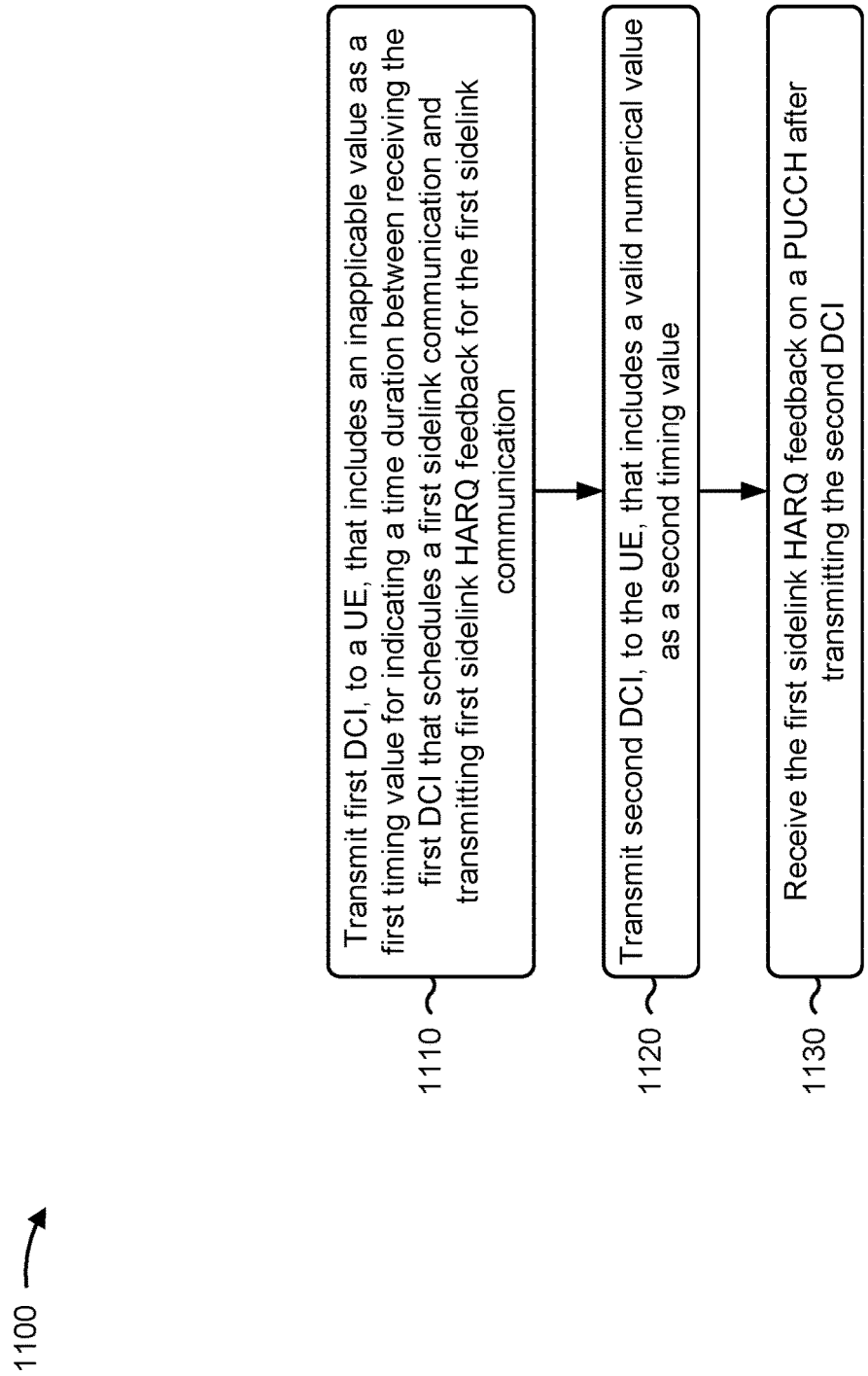
FIG. 11 is a diagram illustrating an example process performed, for example, by a base station, in accordance with the present disclosure.

FIG. 11 is a diagram illustrating an example process 1100 performed, for example, by a base station, in accordance with the present disclosure. Example process 1100 is an example where the base station (e.g., base station 110 depicted in FIGS. 1-2 and 4, BS 610 depicted in FIG. 6, BS 910 depicted in FIG. 9) performs operations associated with non-numerical timing value for sidelink HARQ feedback.

As shown in FIG. 11, in some aspects, process 1100 may include transmitting first DCI, to a UE, that includes an inapplicable value as a first timing value for indicating a time duration between receiving the first DCI that schedules a first sidelink communication and transmitting first sidelink HARQ feedback for the first sidelink communication (block 1110). For example, the base station (e.g., using transmission component 1504 depicted in FIG. 15) may transmit first DCI, to a UE, that includes an inapplicable value as a first timing value for indicating a time duration between receiving the first DCI that schedules a first sidelink communication and transmitting first sidelink HARQ feedback for the first sidelink communication, as described above.

As further shown in FIG. 11, in some aspects, process 1100 may include transmitting second DCI, to the UE, that includes a valid numerical value as a second timing value (block 1120). For example, the base station (e.g., using transmission component 1504 depicted in FIG. 1504) may transmit second DCI, to the UE, that includes a valid numerical value as a second timing value, as described above.

As further shown in FIG. 11, in some aspects, process 1100 may include receiving the first sidelink HARQ feedback on a PUCCH after transmitting the second DCI (block 1130). For example, the base station (e.g., using reception component 1502 depicted in FIG. 15) may receive the first sidelink HARQ feedback on a PUCCH after transmitting the second DCI, as described above.

Process 1100 may include additional aspects, such as any single aspect or any combination of aspects described below and/or in connection with one or more other processes described elsewhere herein.

In a first aspect, the first DCI and the second DCI are in DCI format 3_0.

In a second aspect, alone or in combination with the first aspect, receiving the first sidelink HARQ feedback includes receiving the first sidelink HARQ feedback multiplexed with second sidelink HARQ feedback, for a second sidelink communication that is scheduled by the second DCI, in a sidelink HARQ ACK codebook.

In a third aspect, alone or in combination with one or more of the first and second aspects, the second DCI does not schedule sidelink resources for a second sidelink communication, and the second DCI includes an FDRA field in DCI format 3_0 that is set to invalid.

In a fourth aspect, alone or in combination with one or more of the first through third aspects, receiving the first sidelink HARQ feedback includes receiving the first sidelink HARQ feedback without HARQ feedback for a Uu interface in a sidelink HARQ ACK codebook.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
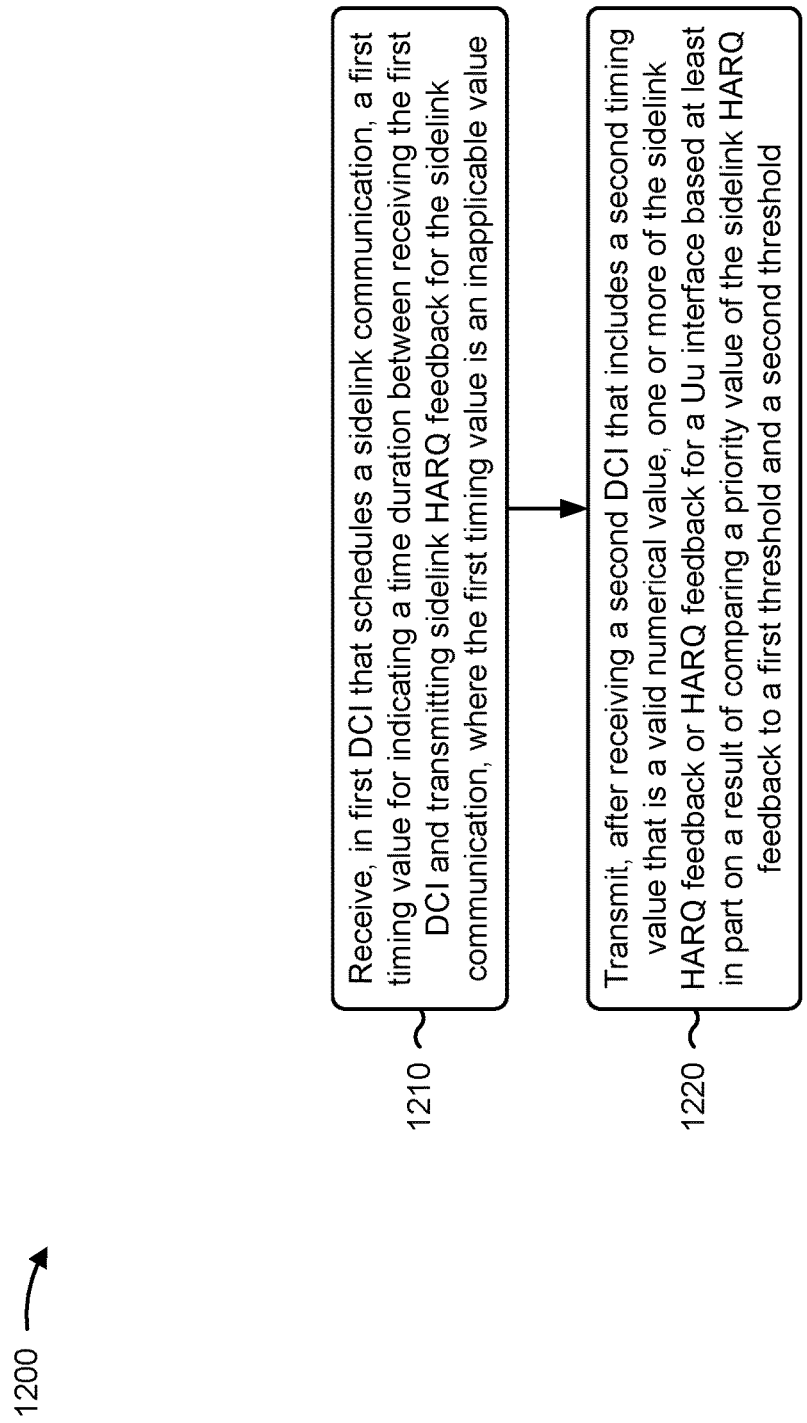
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120 depicted in FIGS. 1-2, UE 305-1 depicted in FIG. 3, UE 405 depicted in FIG. 4, UE 620 depicted in FIG. 6, UE 920 depicted FIG. 9) performs operations associated with non-numerical timing value for sidelink HARQ feedback.

As shown in FIG. 12, in some aspects, process 1200 may include receiving, in first DCI that schedules a sidelink communication, a first timing value for indicating a time duration between receiving the first DCI and transmitting sidelink HARQ feedback for the sidelink communication, where the first timing value is an inapplicable value (block 1210). For example, the UE (e.g., using reception component 1602 depicted in FIG. 16) may receive, in first DCI that schedules a sidelink communication, a first timing value for indicating a time duration between receiving the first DCI and transmitting sidelink HARQ feedback for the sidelink communication, where the first timing value is an inapplicable value, as described above.

In some aspects, process 1200 may include determining that a first timing value, in first DCI that schedules a sidelink communication, for indicating a time duration between receiving the first DCI and transmitting sidelink HARQ feedback for the sidelink communication, is an inapplicable value. For example, the UE (e.g., using determination component 1608 depicted in FIG. 16) may determine that a first timing value, in first DCI that schedules a sidelink communication, for indicating a time duration between receiving the first DCI and transmitting sidelink HARQ feedback for the sidelink communication, is an inapplicable value, as described above.

As further shown in FIG. 12, in some aspects, process 1200 may include transmitting, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold (block 1220). For example, the UE (e.g., using transmission component 1604 depicted in FIG. 16) may transmit, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold, as described above.

Process 1200 may include additional aspects, such as any single aspect or any combination of aspects described below and/or in connection with one or more other processes described elsewhere herein.

In a first aspect, the first DCI and the second DCI are in DCI format 3_0.

In a second aspect, alone or in combination with the first aspect, transmitting the one or more of the sidelink HARQ feedback or HARQ feedback for the Uu interface includes transmitting the sidelink HARQ feedback, without the HARQ feedback for the Uu interface, on a physical uplink control channel based at least in part on a determination that the priority value of the sidelink HARQ feedback does not satisfy the first threshold or the second threshold.

In a third aspect, alone or in combination with one or more of the first and second aspects, transmitting the one or more of the sidelink HARQ feedback or the HARQ feedback for the Uu interface includes transmitting the HARQ feedback for the Uu interface, without the sidelink HARQ feedback, on a physical uplink channel based at least in part on a determination that the priority value of the sidelink HARQ feedback satisfies both the first threshold and the second threshold.

In a fourth aspect, alone or in combination with one or more of the first through third aspects, process 1200 includes discarding the sidelink HARQ feedback.

In a fifth aspect, alone or in combination with one or more of the first through fourth aspects, process 1200 includes buffering the sidelink HARQ feedback, and transmitting the buffered sidelink HARQ feedback multiplexed with other HARQ feedback after receiving a third DCI with a third timing value having a valid numerical value.

In a sixth aspect, alone or in combination with one or more of the first through fifth aspects, transmitting the one or more of the sidelink HARQ feedback or the HARQ feedback for the Uu interface includes transmitting the sidelink HARQ feedback multiplexed with the HARQ feedback for the Uu interface in a HARQ ACK codebook based at least in part on a determination that the priority value of the sidelink HARQ feedback satisfies the first threshold and does not satisfy the second threshold.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
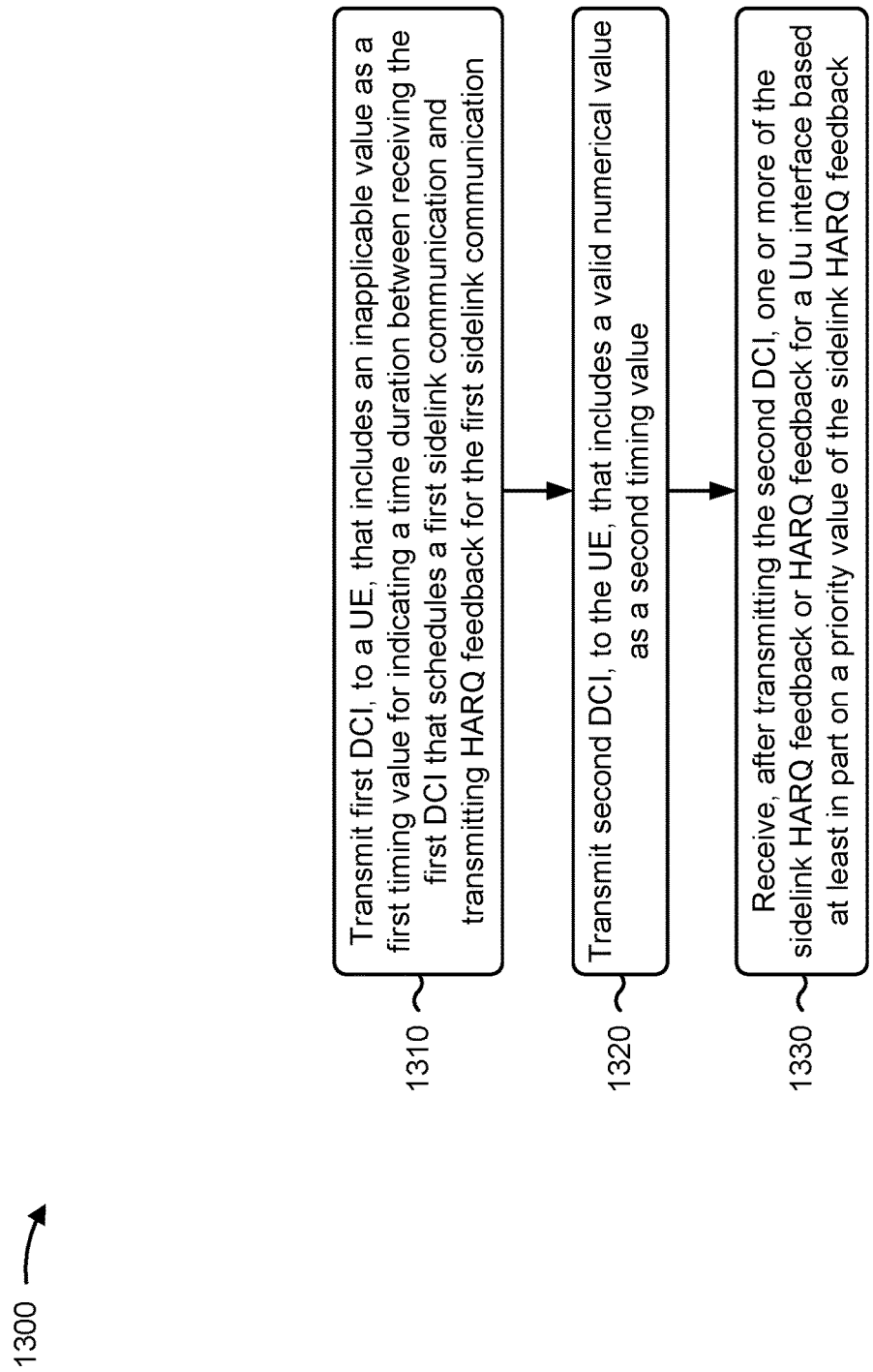
FIG. 13 is a diagram illustrating an example process performed, for example, by a base station, in accordance with the present disclosure.

FIG. 13 is a diagram illustrating an example process 1300 performed, for example, by a base station, in accordance with the present disclosure. Example process 1300 is an example where the base station (e.g., base station 110 depicted in FIGS. 1-2 and 4, BS 610 depicted in FIG. 6, BS 910 depicted in FIG. 9) performs operations associated with non-numerical timing value for sidelink HARQ feedback.

As shown in FIG. 13, in some aspects, process 1300 may include transmitting first DCI, to a UE, that includes an inapplicable value as a first timing value for indicating a time duration between receiving the first DCI that schedules a first sidelink communication and transmitting first sidelink HARQ feedback for the first sidelink communication (block 1310). For example, the base station (e.g., using transmission component 1704 depicted in FIG. 17) may transmit first DCI, to a UE, that includes an inapplicable value as a first timing value for indicating a time duration between receiving the first DCI that schedules a first sidelink communication and transmitting first sidelink HARQ feedback for the first sidelink communication, as described above.

As further shown in FIG. 13, in some aspects, process 1300 may include transmitting second DCI, to the UE, that includes a valid numerical value as a second timing value (block 1320). For example, the base station (e.g., using transmission component 1704 depicted in FIG. 17) may transmit second DCI, to the UE, that includes a valid numerical value as a second timing value, as described above.

As further shown in FIG. 13, in some aspects, process 1300 may include receiving, after transmitting the second DCI, one or more of the sidelink HARQ feedback or HARQ feedback for a Uu interface based at least in part on a priority value of the sidelink HARQ feedback (block 1330). For example, the base station (e.g., using reception component 1702 depicted in FIG. 17) may receive, after transmitting the second DCI, one or more of the sidelink HARQ feedback or HARQ feedback for a Uu interface based at least in part on a priority value of the sidelink HARQ feedback, as described above.

Process 1300 may include additional aspects, such as any single aspect or any combination of aspects described below and/or in connection with one or more other processes described elsewhere herein.

In a first aspect, the first DCI and the second DCI are in DCI format 3_0.

In a second aspect, alone or in combination with the first aspect, process 1300 includes transmitting a first threshold and a second threshold for comparing a sidelink HARQ feedback priority.

In a third aspect, alone or in combination with one or more of the first and second aspects, the first threshold is associated with the UE transmitting the sidelink HARQ feedback, without the HARQ feedback for the Uu interface.

In a fourth aspect, alone or in combination with one or more of the first through third aspects, the second threshold is associated with the UE transmitting the HARQ feedback for the Uu interface, without the sidelink HARQ feedback.

In a fifth aspect, alone or in combination with one or more of the first through fourth aspects, the first threshold and the second threshold are associated with the UE transmitting the sidelink HARQ feedback multiplexed with the HARQ feedback for the Uu interface in a HARQ ACK codebook.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
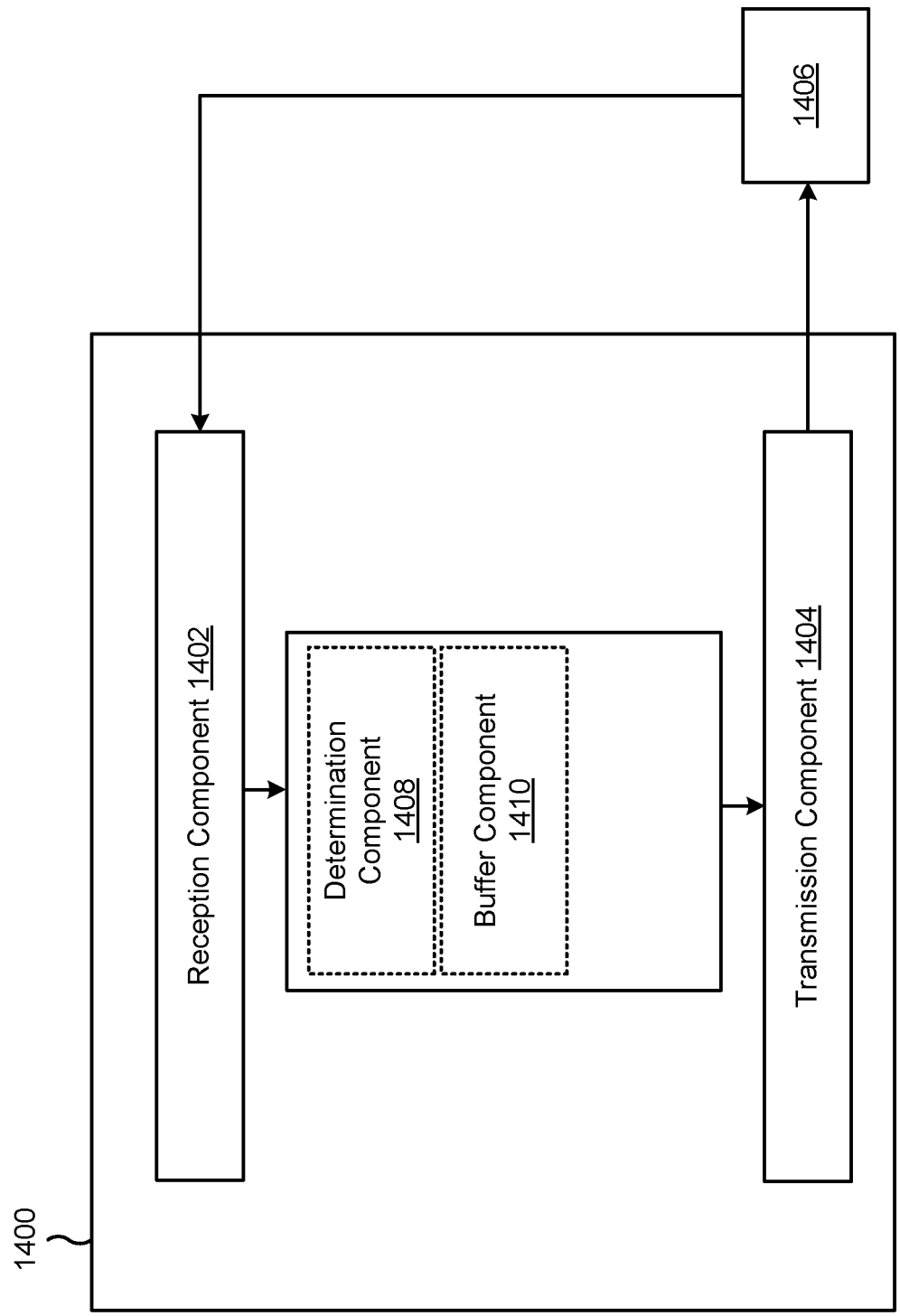
FIGS. 14-17 are block diagrams of example apparatuses for wireless communication, in accordance with the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408 and/or buffer component 1410, among other examples.

In some aspects, the apparatus 1400 may be configured to perform one or more operations described herein in connection with FIGS. 1-13. Additionally, or alternatively, the apparatus 1400 may be configured to perform one or more processes described herein, such as process 1000 of FIG. 10.

In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The determination component 1408 may determine that a first timing value, received by the reception component 1402 in first DCI that schedules a first sidelink communication, for indicating a time duration between receiving the first DCI and transmitting first sidelink HARQ feedback for the first sidelink communication, is an inapplicable value. In some aspects, the determination component 1408 may include a controller/processor, a memory, or a combination thereof, of the UE described above in connection with FIG. 2. The transmission component 1404 may transmit the first sidelink HARQ feedback in a sidelink HARQ ACK codebook based at least in part on receiving a second DCI that includes a second timing value that is a valid numerical value.

The buffer component 1410 may buffer the first sidelink HARQ feedback after determining that the first timing value is an inapplicable value. In some aspects, the buffer component 1410 may include a modulator, a transmit MIMO processor, a transmit processor, a controller/processor, a memory, or a combination thereof, of the UE described above in connection with FIG. 2. The buffer component 1410 may increment a sidelink assignment indicator counter until a timing value with a valid numerical value is received.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
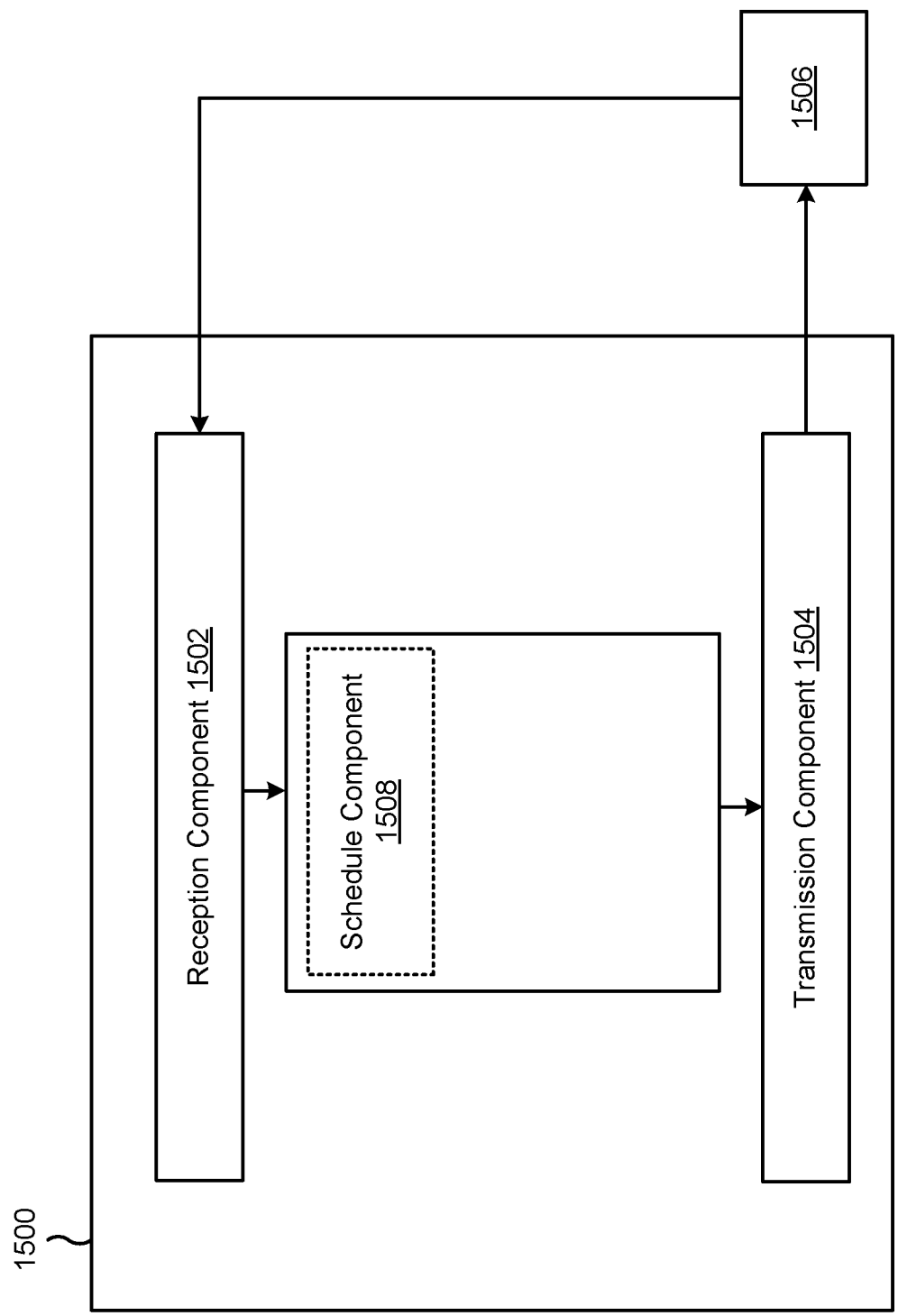

FIG. 15 is a block diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a schedule component 1508, among other examples, for scheduling resources with DCI. The schedule component 1508 may include a controller/processor, a memory, or a combination thereof, of the base station described above in connection with FIG. 2.

In some aspects, the apparatus 1500 may be configured to perform one or more operations described herein in connection with FIGS. 1-13. Additionally, or alternatively, the apparatus 1500 may be configured to perform one or more processes described herein, such as process 1100 of FIG. 11. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be co-located with the reception component 1502 in a transceiver.

The transmission component 1504 may transmit first DCI, to a UE, that includes an inapplicable value as a first timing value for indicating a time duration between receiving the first DCI that schedules a first sidelink communication and transmitting first sidelink HARQ feedback for the first sidelink communication. The transmission component 1504 may transmit second DCI, to the UE, that includes a valid numerical value as a second timing value. The reception component 1502 may receive the first sidelink HARQ feedback on a PUCCH after transmitting the second DCI.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
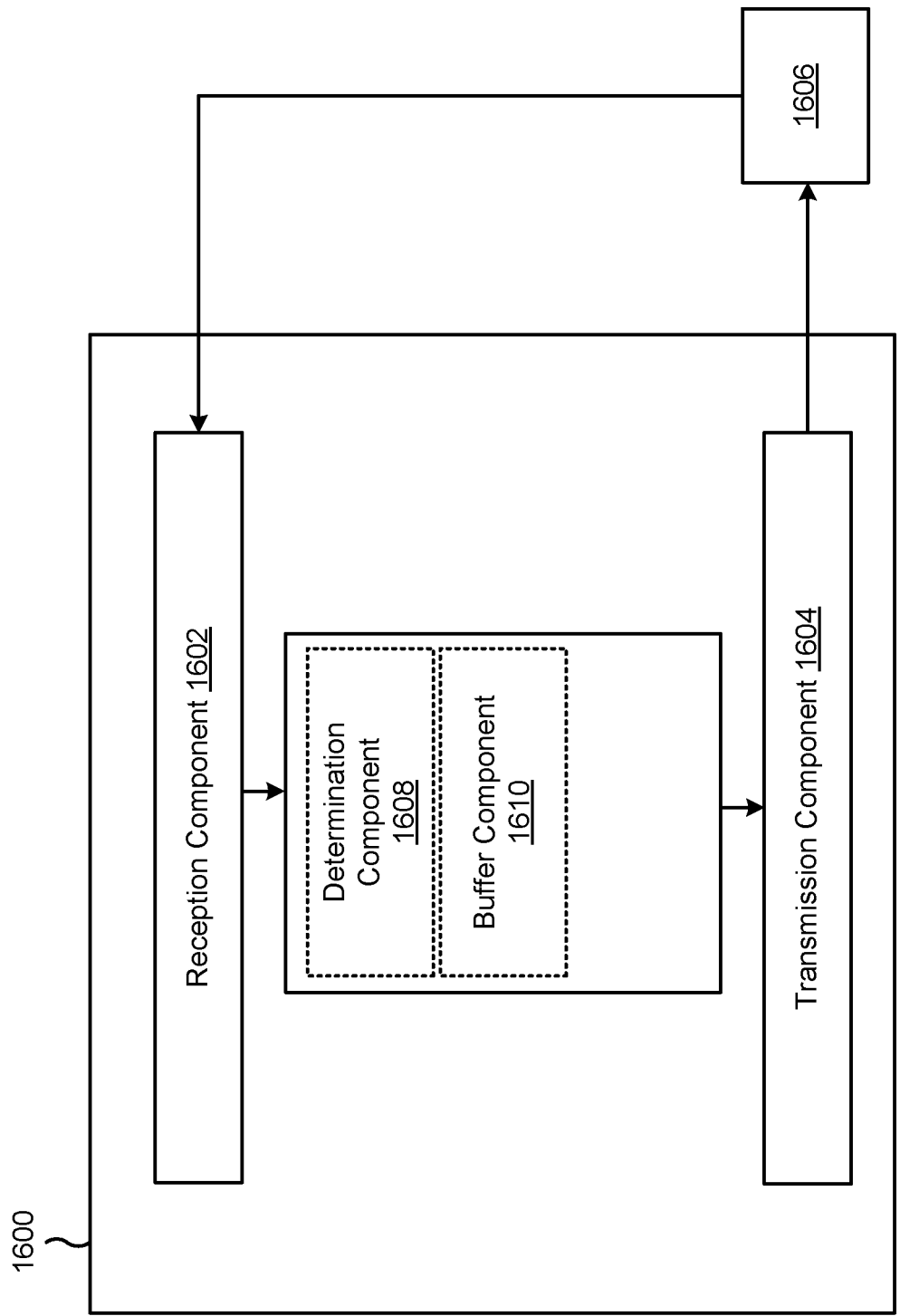

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a determination component 1608 and/or a buffer component 1610, among other examples.

In some aspects, the apparatus 1600 may be configured to perform one or more operations described herein in connection with FIGS. 1-13. Additionally, or alternatively, the apparatus 1600 may be configured to perform one or more processes described herein, such as process 1200 of FIG. 12.

In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver.

The determination component 1608 may determine that a first timing value, receiving by the reception component 1602 in first DCI that schedules a sidelink communication, for indicating a time duration between receiving the first DCI and transmitting sidelink HARQ feedback for the sidelink communication, is an inapplicable value. In some aspects, the determination component 1608 may include a controller/processor, a memory, or a combination thereof, of the UE described above in connection with FIG. 2. The transmission component 1604 may transmit, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold.

The buffer component 1610 may discard the sidelink HARQ feedback. In some aspects, the buffer component 1610 may include a modulator, a transmit MIMO processor, a transmit processor, a controller/processor, a memory, or a combination thereof, of the UE described above in connection with FIG. 2. The buffer component 1610 may buffer the sidelink HARQ feedback.

The transmission component 1604 may transmit the buffered sidelink HARQ feedback multiplexed with other HARQ feedback after receiving a third DCI with a third timing value having a valid numerical value.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
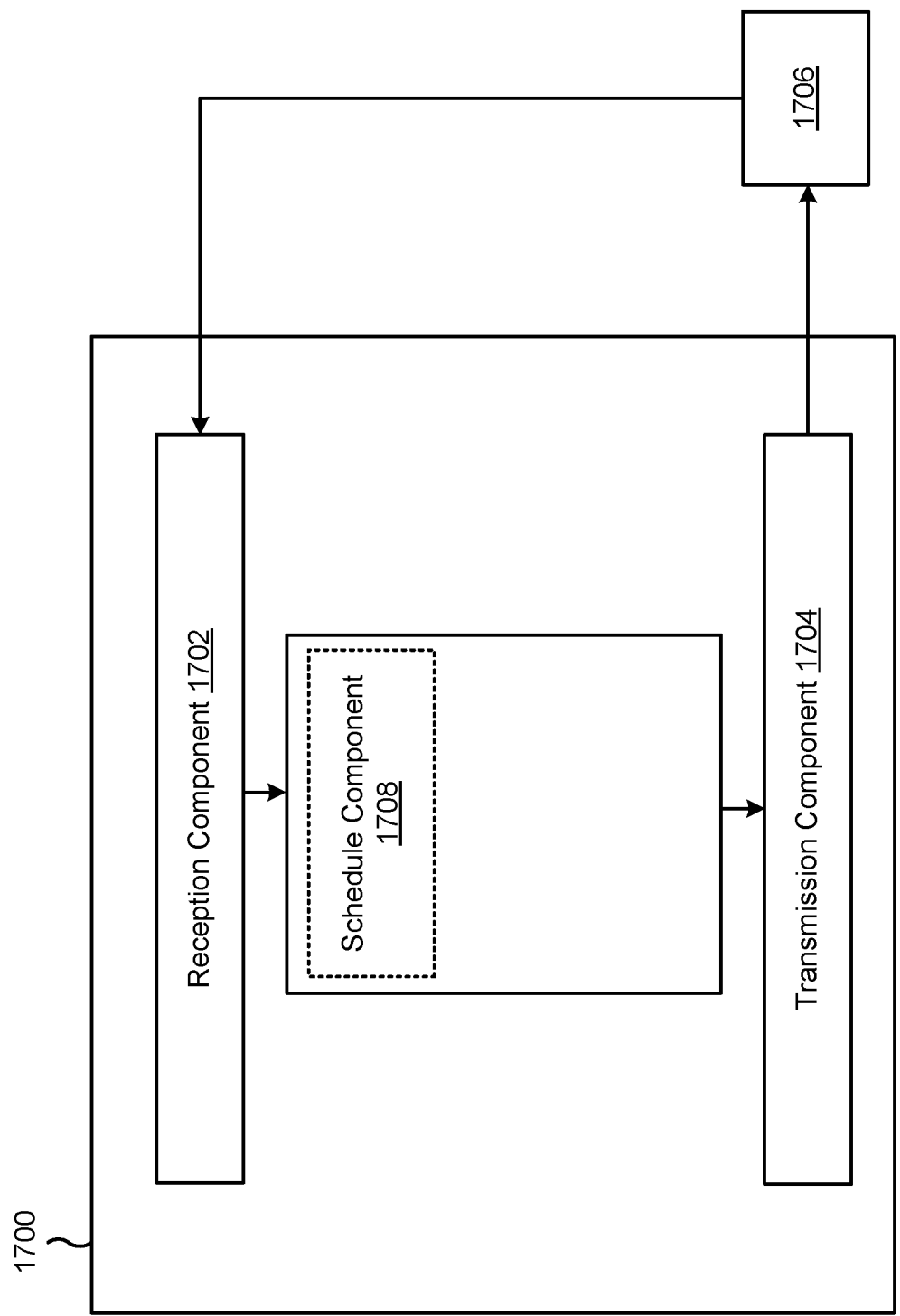

FIG. 17 is a block diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1500 may include a schedule component 1708, among other examples, for scheduling resources with DCI. The schedule component 1708 may include a controller/processor, a memory, or a combination thereof, of the base station described above in connection with FIG. 2.

In some aspects, the apparatus 1700 may be configured to perform one or more operations described herein in connection with FIGS. 1-13. Additionally, or alternatively, the apparatus 1700 may be configured to perform one or more processes described herein, such as process 1300 of FIG. 13. In some aspects, the apparatus 1700 and/or one or more components shown in FIG. 17 may include one or more components of the base station described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the base station described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the base station described above in connection with FIG. 2. In some aspects, the transmission component 1704 may be co-located with the reception component 1702 in a transceiver.

The transmission component 1704 may transmit first DCI, to a UE, that includes an inapplicable value as a first timing value for indicating a time duration between receiving the first DCI that schedules a first sidelink communication and transmitting first sidelink HARQ feedback for the first sidelink communication. The transmission component 1704 may transmit second DCI, to the UE, that includes a valid numerical value as a second timing value. The reception component 1702 may receive, after transmitting the second DCI, one or more of the sidelink HARQ feedback or HARQ feedback for a Uu interface based at least in part on a priority value of the sidelink HARQ feedback.

The transmission component 1704 may transmit a first threshold and a second threshold for comparing a sidelink HARQ feedback priority.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: receiving, in first downlink control information (DCI) that schedules a first sidelink communication, a first timing value for indicating a time duration between receiving the first DCI and transmitting first sidelink hybrid automatic repeat request (HARQ) feedback for the first sidelink communication, wherein the first timing value is an inapplicable value; and transmitting the first sidelink HARQ feedback in a sidelink HARQ acknowledgment (ACK) codebook based at least in part on receiving a second DCI that includes a second timing value that is a valid numerical value.

Aspect 2: The method of Aspect 1, wherein the first DCI and the second DCI are in DCI format 3_0.

Aspect 3: The method of Aspect 1 or 2, wherein the second DCI schedules a second sidelink communication, and wherein the method further comprises multiplexing the first sidelink HARQ feedback with second sidelink HARQ feedback for the second sidelink communication into the sidelink HARQ ACK codebook.

Aspect 4: The method of any of Aspects 1-3, further comprising buffering the first sidelink HARQ feedback after determining that the first timing value is an inapplicable value.

Aspect 5: The method of Aspect 1 or 2, wherein the second DCI does not schedule sidelink resources for a second sidelink communication, and the second DCI includes a frequency domain resource assignment field in DCI format 3_0 that is set to invalid.

Aspect 6: The method of any of Aspects 1-5, further comprising incrementing a sidelink assignment indicator counter until a timing value with a valid numerical value is received.

Aspect 7: The method of any of Aspects 1-6, wherein the first sidelink HARQ feedback is not multiplexed with HARQ feedback for a Uu interface in the sidelink HARQ ACK codebook.

Aspect 8: A method of wireless communication performed by a base station, comprising: transmitting first downlink control information (DCI), to a user equipment (UE), that includes an inapplicable value as a first timing value for indicating a time duration between receiving the first DCI that schedules a first sidelink communication and transmitting first sidelink hybrid automatic repeat request (HARQ) feedback for the first sidelink communication; transmitting second DCI, to the UE, that includes a valid numerical value as a second timing value; and receiving the first sidelink HARQ feedback on a physical uplink control channel (PUCCH) after transmitting the second DCI.

Aspect 9: The method of Aspect 8, wherein the first DCI and the second DCI are in DCI format 3_0.

Aspect 10: The method of Aspect 8 or 9, wherein receiving the first sidelink HARQ feedback includes receiving the first sidelink HARQ feedback multiplexed with second sidelink HARQ feedback, for a second sidelink communication that is scheduled by the second DCI, in a sidelink HARQ acknowledgement (ACK) codebook.

Aspect 11: The method of Aspect 8 or 9, wherein the second DCI does not schedule sidelink resources for a second sidelink communication, and the second DCI includes a frequency domain resource assignment field in DCI format 3_0 that is set to invalid.

Aspect 12: The method of any of Aspects 8-11, wherein receiving the first sidelink HARQ feedback includes receiving the first sidelink HARQ feedback without HARQ feedback for a Uu interface in a sidelink HARQ acknowledgement (ACK) codebook.

Aspect 13: A method of wireless communication performed by a user equipment (UE), comprising: receiving, in first downlink control information (DCI) that schedules a sidelink communication, a first timing value for indicating a time duration between receiving the first DCI and transmitting sidelink hybrid automatic repeat request (HARQ) feedback for the sidelink communication, wherein the first timing value is an inapplicable value; and transmitting, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold.

Aspect 14: The method of Aspect 13, wherein the first DCI and the second DCI are in DCI format 3_0.

Aspect 15: The method of Aspect 13 or 14, wherein transmitting the one or more of the sidelink HARQ feedback or HARQ feedback for the Uu interface includes transmitting the sidelink HARQ feedback, without the HARQ feedback for the Uu interface, on a physical uplink control channel based at least in part on a determination that the priority value of the sidelink HARQ feedback does not satisfy the first threshold or the second threshold.

Aspect 16: The method of Aspect 13 or 14, wherein transmitting the one or more of the sidelink HARQ feedback or the HARQ feedback for the Uu interface includes transmitting the HARQ feedback for the Uu interface, without the sidelink HARQ feedback, on a physical uplink channel based at least in part on a determination that the priority value of the sidelink HARQ feedback satisfies both the first threshold or the second threshold.

Aspect 17: The method of Aspect 16, further comprising discarding the sidelink HARQ feedback.

Aspect 18: The method of Aspect 16, further comprising: buffering the sidelink HARQ feedback; and transmitting the buffered sidelink HARQ feedback multiplexed with other HARQ feedback after receiving a third DCI with a third timing value having a valid numerical value.

Aspect 19: The method of any of Aspects 13-18, wherein transmitting the one or more of the sidelink HARQ feedback or the HARQ feedback for the Uu interface includes transmitting the sidelink HARQ feedback multiplexed with the HARQ feedback for the Uu interface in a HARQ acknowledgement (ACK) codebook based at least in part on a determination that the priority value of the sidelink HARQ feedback satisfies the first threshold and does not satisfy the second threshold.

Aspect 20: A method of wireless communication performed by a base station, comprising: transmitting first downlink control information (DCI), to a user equipment (UE), that includes an inapplicable value as a first timing value for indicating a time duration between receiving the first DCI that schedules a first sidelink communication and transmitting first sidelink hybrid automatic repeat request (HARQ) feedback for the first sidelink communication; transmitting second DCI, to the UE, that includes a valid numerical value as a second timing value; and receiving, after transmitting the second DCI, one or more of the sidelink HARQ feedback or HARQ feedback for a Uu interface based at least in part on a priority value of the sidelink HARQ feedback.

Aspect 21: The method of Aspect 20, wherein the first DCI and the second DCI are in DCI format 3_0.

Aspect 22: The method of Aspect 20 or 21, further comprising transmitting a first threshold and a second threshold for comparing a sidelink HARQ feedback priority.

Aspect 23: The method of Aspect 22, wherein the first threshold is associated with the UE transmitting the sidelink HARQ feedback, without the HARQ feedback for the Uu interface.

Aspect 24: The method of Aspect 22, wherein the second threshold is associated with the UE transmitting the HARQ feedback for the Uu interface, without the sidelink HARQ feedback.

Aspect 25: The method of Aspect 22, wherein the first threshold and the second threshold are associated with the UE transmitting the sidelink HARQ feedback multiplexed with the HARQ feedback for the Uu interface in a HARQ acknowledgement (ACK) codebook.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving, in first downlink control information (DCI) that schedules a first sidelink communication, a first timing value for indicating a time duration between receiving the first DCI and transmitting first sidelink hybrid automatic repeat request (HARQ) feedback for the first sidelink communication, wherein the first timing value is an inapplicable value; and
transmitting the first sidelink HARQ feedback in a sidelink HARQ acknowledgment (ACK) codebook based at least in part on receiving a second DCI that includes a second timing value that is a valid numerical value,
wherein a sidelink assignment indicator counter is incremented until the second timing value that is the valid numerical value is received.

2. The method of claim 1, wherein the first DCI and the second DCI are in DCI format 3_0.

3. The method of claim 1, wherein the second DCI schedules a second sidelink communication, and wherein the method further comprises multiplexing the first sidelink HARQ feedback with second sidelink HARQ feedback for the second sidelink communication into the sidelink HARQ ACK codebook.

4. The method of claim 1, further comprising buffering the first sidelink HARQ feedback after determining that the first timing value is an inapplicable value.

5. The method of claim 1, wherein the second DCI does not schedule sidelink resources for a second sidelink communication, and the second DCI includes a frequency domain resource assignment field in DCI format 3_0 that is set to invalid.

6. The method of claim 1, wherein the first sidelink HARQ feedback is not multiplexed with HARQ feedback for a Uu interface in the sidelink HARQ ACK codebook.

7. The method of claim 1, wherein the sidelink HARQ feedback is transmitted based at least in part on a result of comparing a priority value of the sidelink HARQ feedback to a first threshold and a second threshold.

8. A method of wireless communication performed by a base station, comprising:
transmitting first downlink control information (DCI), to a user equipment (UE), that includes an inapplicable value as a first timing value for indicating a time duration between receiving the first DCI that schedules a first sidelink communication and transmitting first sidelink hybrid automatic repeat request (HARQ) feedback for the first sidelink communication;
transmitting second DCI, to the UE, that includes a valid numerical value as a second timing value,
wherein the inapplicable value is associated with a sidelink assignment indicator counter that is incremented until the valid numerical value as the second timing value is received by the UE; and
receiving the first sidelink HARQ feedback on a physical uplink control channel (PUCCH) after transmitting the second DCI.

9. The method of claim 8, wherein the first DCI and the second DCI are in DCI format 3_0.

10. The method of claim 8, wherein receiving the first sidelink HARQ feedback includes receiving the first sidelink HARQ feedback multiplexed with second sidelink HARQ feedback, for a second sidelink communication that is scheduled by the second DCI, in a sidelink HARQ acknowledgement (ACK) codebook.

11. The method of claim 8, wherein the second DCI does not schedule sidelink resources for a second sidelink communication, and the second DCI includes a frequency domain resource assignment field in DCI format 3_0 that is set to invalid.

12. The method of claim 8, wherein receiving the first sidelink HARQ feedback includes receiving the first sidelink HARQ feedback without HARQ feedback for a Uu interface in a sidelink HARQ acknowledgement (ACK) codebook.

13. A method of wireless communication performed by a user equipment (UE), comprising:
receiving, in first downlink control information (DCI) that schedules a sidelink communication, a first timing value for indicating a time duration between receiving the first DCI and transmitting sidelink hybrid automatic repeat request (HARQ) feedback for the sidelink communication, wherein the first timing value is an inapplicable value; and
transmitting, after receiving a second DCI that includes a second timing value that is a valid numerical value, one or more of the sidelink HARQ feedback or HARQ feedback for a Uu interface based at least in part on a result of comparing a priority value of the sidelink HARQ feedback to a first threshold and a second threshold.

14. The method of claim 13, wherein the first DCI and the second DCI are in DCI format 3_0.

15. The method of claim 13, wherein transmitting the one or more of the sidelink HARQ feedback or HARQ feedback for the Uu interface includes transmitting the sidelink HARQ feedback, without the HARQ feedback for the Uu interface, on a physical uplink control channel based at least in part on a determination that the priority value of the sidelink HARQ feedback does not satisfy the first threshold or the second threshold.

16. The method of claim 13, wherein transmitting the one or more of the sidelink HARQ feedback or the HARQ feedback for the Uu interface includes transmitting the HARQ feedback for the Uu interface, without the sidelink HARQ feedback, on a physical uplink channel based at least in part on a determination that the priority value of the sidelink HARQ feedback satisfies both the first threshold or the second threshold.

17. The method of claim 16, further comprising discarding the sidelink HARQ feedback.

18. The method of claim 16, further comprising:
buffering the sidelink HARQ feedback; and
transmitting the buffered sidelink HARQ feedback multiplexed with other HARQ feedback after receiving a third DCI with a third timing value having a valid numerical value.

19. The method of claim 13, wherein transmitting the one or more of the sidelink HARQ feedback or the HARQ feedback for the Uu interface includes transmitting the sidelink HARQ feedback multiplexed with the HARQ feedback for the Uu interface in a HARQ acknowledgement (ACK) codebook based at least in part on a determination that the priority value of the sidelink HARQ feedback satisfies the first threshold and does not satisfy the second threshold.

20. A method of wireless communication performed by a base station, comprising:
transmitting first downlink control information (DCI), to a user equipment (UE), that includes an inapplicable value as a first timing value for indicating a time duration between receiving the first DCI that schedules a first sidelink communication and transmitting first sidelink hybrid automatic repeat request (HARQ) feedback for the first sidelink communication;
transmitting second DCI, to the UE, that includes a valid numerical value as a second timing value; and
receiving, after transmitting the second DCI, one or more of the sidelink HARQ feedback or HARQ feedback for a Uu interface based at least in part on a priority value of the sidelink HARQ feedback.

21. The method of claim 20, wherein the first DCI and the second DCI are in DCI format 3_0.

22. The method of claim 20, further comprising transmitting a first threshold and a second threshold for comparing a sidelink HARQ feedback priority.

23. The method of claim 22, wherein the first threshold is associated with the UE transmitting the sidelink HARQ feedback, without the HARQ feedback for the Uu interface.

24. The method of claim 22, wherein the second threshold is associated with the UE transmitting the HARQ feedback for the Uu interface, without the sidelink HARQ feedback.

25. The method of claim 22, wherein the first threshold and the second threshold are associated with the UE transmitting the sidelink HARQ feedback multiplexed with the HARQ feedback for the Uu interface in a HARQ acknowledgement (ACK) codebook.

* * * * *